(12) United States Patent
Pyeon et al.

(10) Patent No.: US 8,046,527 B2
(45) Date of Patent: Oct. 25, 2011

(54) APPARATUS AND METHOD FOR USING A PAGE BUFFER OF A MEMORY DEVICE AS A TEMPORARY CACHE

(75) Inventors: Hong Beom Pyeon, Kanata (CA); Jin-Ki Kim, Kanata (CA); HakJune Oh, Kanata (CA)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 350 days.

(21) Appl. No.: 12/029,634

(22) Filed: Feb. 12, 2008

(65) Prior Publication Data

US 2008/0205168 A1    Aug. 28, 2008

Related U.S. Application Data

(60) Provisional application No. 60/891,115, filed on Feb. 22, 2007.

(51) Int. Cl.
*G06F 13/00* (2006.01)
*G06F 13/28* (2006.01)
*G06F 3/00* (2006.01)
*G06F 5/00* (2006.01)

(52) U.S. Cl. . 711/103; 711/118; 711/154; 711/E12.002; 710/52

(58) Field of Classification Search .................. 711/103, 711/118, 154, E12.002; 710/52
See application file for complete search history.

(56) References Cited

U.S. PATENT DOCUMENTS

| | | | |
|---|---|---|---|
| 4,174,536 A | 11/1979 | Misunas et al. | |
| 4,733,376 A | 3/1988 | Ogawa | |
| 4,796,231 A | 1/1989 | Pinkham | |
| 4,899,316 A | 2/1990 | Nagami | |
| 5,038,299 A | 8/1991 | Maeda | |
| 5,126,808 A | 6/1992 | Montalvo et al. | |
| 5,136,292 A | 8/1992 | Ishida | |
| 5,175,819 A | 12/1992 | Le Ngoc et al. | |
| 5,243,703 A | 9/1993 | Farmwald et al. | |
| 5,249,270 A | 9/1993 | Stewart et al. | |
| 5,280,539 A | 1/1994 | Yeom et al. | |
| 5,365,484 A | 11/1994 | Cleveland et al. | |
| 5,404,460 A | 4/1995 | Thomsen et al. | |

(Continued)

FOREIGN PATENT DOCUMENTS

EP        0952525        10/1999

(Continued)

OTHER PUBLICATIONS

Shirota, R., et al., "A 2.3um2 Memory Cell Structure for 16Mb NAND EEPROMs", International Electron Devices Meeting 1990, Technical Digest, (1990), pp. 103-106.

(Continued)

*Primary Examiner* — Edward J Dudek, Jr.
(74) *Attorney, Agent, or Firm* — Shuji Sumi

(57) ABSTRACT

An apparatus and method are provided for using a page buffer of a memory device as a temporary cache for data. A memory controller writes data to the page buffer and later reads out the data without programming the data into the memory cells of the memory device. This allows the memory controller to use the page buffer as temporary cache so that the data does not have to occupy space within the memory controller's local data storage elements. Therefore, the memory controller can use the space in its own storage elements for other operations.

15 Claims, 22 Drawing Sheets

U.S. PATENT DOCUMENTS

| | | | |
|---|---|---|---|
| 5,440,694 A | 8/1995 | Nakajima | |
| 5,452,259 A | 9/1995 | McLaury | |
| 5,473,563 A | 12/1995 | Suh et al. | |
| 5,473,566 A | 12/1995 | Rao | |
| 5,473,577 A | 12/1995 | Miyake et al. | |
| 5,596,724 A | 1/1997 | Mullins et al. | |
| 5,602,780 A | 2/1997 | Diem et al. | |
| 5,636,342 A | 6/1997 | Jeffries | |
| 5,671,178 A | 9/1997 | Park et al. | |
| 5,721,840 A | 2/1998 | Soga | |
| 5,729,683 A | 3/1998 | Le et al. | |
| 5,740,379 A | 4/1998 | Hartwig | |
| 5,761,146 A | 6/1998 | Yoo et al. | |
| 5,771,199 A | 6/1998 | Lee | |
| 5,802,006 A | 9/1998 | Ohta | |
| 5,818,785 A | 10/1998 | Ohshima | |
| 5,828,899 A | 10/1998 | Richard et al. | |
| 5,835,935 A | 11/1998 | Estakhri et al. | |
| 5,859,809 A | 1/1999 | Kim | |
| 5,860,080 A | 1/1999 | James et al. | |
| 5,872,994 A | 2/1999 | Akiyama et al. | |
| 5,937,425 A | 8/1999 | Ban | |
| 5,941,974 A | 8/1999 | Babin | |
| 5,959,930 A | 9/1999 | Sakurai | |
| 5,995,417 A | 11/1999 | Chen et al. | |
| 6,002,638 A | 12/1999 | John | |
| 6,085,290 A | 7/2000 | Smith et al. | |
| 6,091,660 A | 7/2000 | Sasaki et al. | |
| 6,107,658 A | 8/2000 | Itoh et al. | |
| 6,144,576 A | 11/2000 | Leddige et al. | |
| 6,148,364 A | 11/2000 | Srinivasan et al. | |
| 6,178,135 B1 | 1/2001 | Kang | |
| 6,230,233 B1 | 5/2001 | Lofgren et al. | |
| 6,304,921 B1 | 10/2001 | Rooke | |
| 6,317,350 B1 | 11/2001 | Pereira et al. | |
| 6,317,352 B1 | 11/2001 | Halbert et al. | |
| 6,438,064 B2 | 8/2002 | Ooishi | |
| 6,442,098 B1 | 8/2002 | Kengeri | |
| 6,453,365 B1 | 9/2002 | Habot | |
| 6,456,528 B1 | 9/2002 | Chen | |
| 6,535,948 B1 | 3/2003 | Wheeler et al. | |
| 6,584,303 B1 | 6/2003 | Kingswood et al. | |
| 6,594,183 B1 | 7/2003 | Lofgren et al. | |
| 6,601,199 B1 | 7/2003 | Fukuda et al. | |
| 6,611,466 B2 | 8/2003 | Lee et al. | |
| 6,658,582 B1 | 12/2003 | Han | |
| 6,680,904 B1 | 1/2004 | Kaplan et al. | |
| 6,697,936 B2 | 2/2004 | Johnson | |
| 6,715,044 B2 | 3/2004 | Lofgren et al. | |
| 6,717,847 B2 | 4/2004 | Chen | |
| 6,732,221 B2 | 5/2004 | Ban | |
| 6,754,807 B1 | 6/2004 | Parthasarathy et al. | |
| 6,763,426 B1 | 7/2004 | James et al. | |
| 6,788,609 B2 | 9/2004 | Yamagami et al. | |
| 6,807,103 B2 | 10/2004 | Cavaleri et al. | |
| 6,807,106 B2 | 10/2004 | Gonzales et al. | |
| 6,816,933 B1 | 11/2004 | Andreas | |
| 6,850,443 B2 | 2/2005 | Lofgren et al. | |
| 6,853,557 B1 | 2/2005 | Haba et al. | |
| 6,853,573 B2 | 2/2005 | Kim et al. | |
| 6,928,501 B2 | 8/2005 | Andreas et al. | |
| 6,944,697 B2 | 9/2005 | Andreas | |
| 6,950,325 B1 | 9/2005 | Chen | |
| 6,967,874 B2 | 11/2005 | Hosono | |
| 6,996,644 B2 | 2/2006 | Schoch et al. | |
| 7,073,022 B2 | 7/2006 | El-Batal et al. | |
| 7,111,140 B2 | 9/2006 | Estakhri et al. | |
| 7,123,541 B2 | 10/2006 | Bell et al. | |
| 7,165,153 B2 | 1/2007 | Vogt | |
| 7,190,617 B1 | 3/2007 | Harari et al. | |
| 7,774,537 B2 | 8/2010 | Pyeon | |
| 7,853,749 B2 | 12/2010 | Kolokowsky | |
| 2002/0124129 A1* | 9/2002 | Zilberman | 711/103 |
| 2002/0161941 A1 | 10/2002 | Chue et al. | |
| 2004/0001380 A1 | 1/2004 | Becca et al. | |
| 2004/0019736 A1 | 1/2004 | Kim et al. | |
| 2004/0024960 A1 | 2/2004 | King et al. | |
| 2004/0039854 A1 | 2/2004 | Estakhri et al. | |
| 2004/0199721 A1 | 10/2004 | Becca et al. | |
| 2004/0230738 A1 | 11/2004 | Lim et al. | |
| 2004/0230743 A1 | 11/2004 | Ware et al. | |
| 2005/0120163 A1* | 6/2005 | Chou et al. | 711/103 |
| 2005/0160218 A1 | 7/2005 | See et al. | |
| 2005/0213421 A1 | 9/2005 | Polizzi et al. | |
| 2005/0286298 A1 | 12/2005 | Hyvonen et al. | |
| 2006/0050594 A1 | 3/2006 | Park | |
| 2006/0198202 A1* | 9/2006 | Erez | 365/185.29 |
| 2006/0224789 A1 | 10/2006 | Cho et al. | |
| 2006/0271605 A1 | 11/2006 | Petruzzo | |
| 2007/0050536 A1 | 3/2007 | Kolokowsky | |
| 2007/0177436 A1 | 8/2007 | Davis et al. | |
| 2008/0155207 A1* | 6/2008 | Eilert et al. | 711/154 |
| 2008/0205168 A1 | 8/2008 | Pyeon et al. | |

FOREIGN PATENT DOCUMENTS

| | | |
|---|---|---|
| WO | 01169411 | 9/2001 |
| WO | PCT/CA2007/001428 | 12/2007 |
| WO | PCT/CA2008/000250 | 6/2008 |
| WO | PCT/CA2008/000219 | 8/2008 |

OTHER PUBLICATIONS

Hara, T. et al., "A 146-mm2 8-Gb Multi-Level NAND Flash Memory With 70-nm CMOS Technology", IEEE Journal of Solid State Circuits, Jan. 2006, vol. 41, No. 1, pp. 161-169.

Lee, S. et al., "A 3.3V 4Gb Four-Level NAND Flash Memory with 90nm CMOS Technology",ISSCC 2004/Session 2 Non-Volatile Memory/2.7, IEEE International Solid-State Circuits Conference, Feb. 15-19, 2004, Digest of Technical Papers, pp. 52-513, vol. 1, XP010722148, ISBN: 0-7803-8267-6.

Takeuchi, K. et al, "A 56nm CMOS 99mm2 8Gb Multi-level NAND Flash Memory with 10MB/s Program Throughput", Solid-State Circuits, 2006 IEEE International Conference Digest of Technical Papers, Feb. 6-9, 2006 ISBN: 1-4244-0079-1.

Samsung Electronics Co. Ltd, "256M × 8 Bit / 128 M × 16 Bit / 512M × 8 Bit NAND Flash Memory", K9K4G08U1M, May 6, 2005, pp. 1-41.

Samsung Electronics Co. Ltd, "1G × 8 Bit / 1G × 8 Bit NAND Flash Memory", K9F8G08UXM, May 31, 2007, pp. 1-54.

Samsung Electronics Co. Ltd, "512M × 8 Bit / 1G × 8 Bit NAND Flash Memory", K9XXG08UXA, May 7, 2006, pp. 1-43.

Samsung Electronics Co. Ltd, "1G × 8 Bit / 2G × 8 Bit / 4G × 8 Bit NAND Flash Memory", K9XXG08UXA, Jul. 18, 2006, pp. 1-50.

Choi, Young, "16-Gbit MLC NAND Flash Weighs in", EETimes. com, Jul. 7, 2007, pp. 1-3, http://www.eetimes.com/showArticle. jhtml?articleID=201200825.

Gal, et al., "Algorithms and data structures for flash memories", ACM Computing Surveys (CSUR), vol. 37, No. 2, p. 138-163, Jun. 2005, Tel Aviv University.

Lee J. et al., "A 90-nm CMOS 1.8-V 2Gb NAND Flash Memory for Mass Storage Applications", IEEE Journal of Solid-State Circuits, vol. 38, No. 11, Nov. 2003. pp. 1934-1942.

Samsung Electronics Co. Ltd, "2G × 8 Bit NAND Flash Memory", K9GAG08U0M, Apr. 12, 2006, pp. 1-48.

Toshiba, "16 GBIT (2G × 8 Bit) CMOS NAND E2PROM (Multi-Level-Cell)", TC58NVG4D1DTG00, Nov. 9, 2006.

Toshiba, "2GBIT (256M × 8 Bits) CMOS NAND E2PROM", TH58NVG1S3AFT05, May 19, 2003.

IEEE Standard for High-Bandwidth Memory Interface Based on Scalable Coherent Interface (SCI) Signaling Technology (RAMLINK), IEEE Std. 1596.4-1996, The Institute of Electrical Electronics Engineers, Inc., pp. I-91, (Mar. 1996).

64 Megabit CMOS 3.0 Volt Flash Memory with 50MHz SPI. Spansion, pp. 1-22.

M-Systems Flash Disk Pioneers Ltd., "DiskOnChip H1 4Gb (512MByte) and 8Gb (1GByte) High Capacity Flash Disk with NAND and x2 Technology", Data Sheet, Rev. 0.5 (Preliminary), pp. 1-66,2005.

Tal, A., "Guidelines for Integrating DiskOnChip in a Host System", AP-DOC-1004, Rev. 1.0, M-Systems Flash Pioneers Ltd., pp. 1-15,2004.

Samsung Electronics Co. Ltd, OneNAND4G(KFW4G16Q2M-DEB6), OneNAND2G(KFH2G16Q2M-DEB6), OneNAND1G(KFW1 G16Q2M-DEB6) Flash Memory, OneNANDTM Specification Ver. 1.2, pp. 1-125 Dec. 23, 2005.

Kennedy, J., et al., "A 2Gb/s Point-to-Point Heterogeneous Voltage Capable DRAM Interface for Capacity-Scalable 5 Memory Subsystems", ISSCC 2004/Session 1IDRAM/11.S, IEEE International Solid-State Circuits Conference, Feb. 15-19, 2004, vol. 1, pp. 214-523.

Kim, Jae-Kwan, et al., "A 3.6Gb/s/pin Simultaneous Bidirectional (SBD) 110 Interface for High-Speed DRAM", ISSCC 6 2004/Session 22/DSL and Multi-Gb/s 11022.7, IEEE International Solid-State Circuits Conference Feb. 15-19, 2004 vol. 1, pp. 414-415.

"HyperTransport TM 110 Link Specification", Revision 2.00, Document No. HTC20031217-0036-00, Hypertransport Technology Consortium, pp. 1-325,2001.

Oshima, et al., "High-Speed Memory Architectures for Multimedia Applications", Circuits & Devices, IEEE 8755-3996/97, pp. 8-13, Jan. 1997.

Gjessing, S., et al., "Ram Link: A High-Bandwidth Point-to-Point Memory Architecture", Proceedings CompCom 1992, IEEE 0-8186-2655-0/92, pp. 328-331, Feb. 24-25, 1992.

Gjessing. S., et al., "Performance of the Ram Link Memory Architecture", Proceedings of the Twenty-Seventh Annual Hawaii International Conference on System Sciences, IEEE 1060-3425/94, pp. 154-162, Jan. 1994.

Gjessing. S., et al., "A RAM Link for High Speed", Special Report|Memory, IEEE Spectrum, pp. 52-53, Oct. 1992.

Diamond, S.L., "SyncLink: High: High-speed DRAM for the Future", Micro Standards, IEEE Micro, pp. 74-75, Dec. 1996.

"HyperTransport TM 1/0 Link Specification", Revision 3.00 Document No. HTC20051222-0046-0008, Hypertransport Technology Consortium, pp. 1-428, Apr. 2006.

Samsung Electronics, "DDR2 Fully Buffered DIMM 240pin FBDIMMS based on 512Mb C-die" Rev. 1.3, Sep. 2006, pp. 1-32.

"HyperTransport TM 1/0 Link Specification", Revision 3.00, Document No. HTC20051 222-0046-0008, Hypertransport Technology Consortium, pp. 1-428, Apr. 2006.

Intel Corporation, "Intel®Advanced+ Boot Block Flash Memory (C3)", May 2005, pp. 1-72.

Amtel Corp., "High Speed Small Sectored SPI Flash Memory", pp. 1-22,2006.

Hara, T. et al., "A 146mm2 8Gb NAND Flash Memory with 70nm CMOS Technology", ISSCC Session 2 Non-Volatile Memory 2.1, IEEE International Solid-State Circuits Conference, Feb. 2005, pp. 44, 45 and 584.

Byeon, D. et al., "An 8Gb Multi-Level NAND Flash Memory with 63nm STI CMOS Process Technology", ISSCC Session 2 Non-Volatile Memory 2.2, IEEE International Solid-State Circuits Conference, Feb. 2005, pp. 46 and 47.

Tanzawa, T. et al., "Circuit Techniques for a 1.8-V-Only NAND Flash Memory", IEEE Journal of Solid-State Circuits, vol. 37, No. 1, Jan. 2002, pp. 84-89.

Saito, et al., "A Programmable 8Ons 1Mb CMOS EPROM", IEEE ISSCC Digest of Technical Papers, Feb. 14, 1985, pp. 176-177, 340.

Momodomi, M. et al., "A 4 Mb NAND EEPROM with tight programmed Vt Distribution", IEEE Journal of Solid-State Circuits, vol. 26, Issue 4, Apr. 1991, pp. 492-496.

Ohtsuka, N. et al., "A 4-Mbit CMOS EPROM", IEEE Journal of Solid-State Circuits, vol. 22, Issue 5, Oct 1987, pp. 669-675.

Kim, et al. "A 120-mm2 64 Mb NAND Flash Memory Archieving 180 ns/Byte Effective Program Speed," IEEE Journal of Solid-State Circuits, vol. 32, No. 5, May 1977, pp. 670-680.

Suh, K. et al., "A 3.3 V 32 Mb NAND Flash Memory with Incremental Step Pulse Programming Scheme", IEEE Journal of Solid-State Circuits, vol. 30, No. 11, Nov. 1995, pp. 1149-1156.

Takeuchi, K. et al., "A multipage cell architecture for high-speed programming multilevelNAND flash memories", IEEE Journal of Solid-State Circuits, vol. 33, Issue 8, Aug 1998, pp. 1228-1238.

Tanzawa, et al., "A dynamic analysis of the Dickson charge pump circuit;" IEEE J. Solid-State Circuits, vol. 32, No. 8, pp. 1231-1240, Aug. 1997.

Tanaka, T. et al., "A quick intelligent page-programming architecture and a shieldedbitline sensing method for 3 Vonly NAND flash memory", IEEE Journal of Solid-state Circuits, vol. 29, Issue 11, Nov. 1994, pp. 1366-1373.

Imamiya, K. et al., "A 125-mm2 1-Gb NAND Flash Memory with 10-MByte/s Program Speed", IEEE Journal of Solid-State Circuits, vol. 37, No. 11, Nov. 2002, pp. 1493-1501.

Lee, J. et al., "High-Performance 1-Gb NAND Flash Memory with 0.12-•m Technology", IEEE Journal of Solid-State Circuits, vol. 37, No. 11, Nov. 2002, pp. 1502-1509.

Jung, T. et al., "A 117-mm2 3.3-V Only 128-Mb Multilevel NAND Flash Memory for Mass Storage Applications," IEEE Journal of Solid-State Circuits, vol. 31, No. 11, Nov. 1996, pp. 1575-1583.

Tomita, N. et al., "A 62-ns. 16Mb CMOS EPROMm with Voltage Stress Relaxation Technique" IEEE Journal of Solid-State Circuits vol. 26, No. 11, Nov. 1991, pp. 1593-1599.

Cho, T. et al., "A Dual Mode NAND Flash Memory: 1-Gb Multilevel and High-Performance 512-Mb Single-Level Modes", IEEE Journal of Solid-State Circuits, vol. 36, No. 11, Nov. 2001, pp. 1700-1706.

Kirisawa, R. et al., "A NAND Structured Cell with a new Programming Technology for Highly Reliable 5V-Only Flash EEPROM", 1990 Symposium on VLSI Technology, Jun. 4, 1990, CH 2874-6, 90/0000-0129 1990 IEEE, Honolulu, US, pp. 129-130.

Aritome, S. et al., "A Reliable Bi-Polarity Write/Erase Technology in Flash EEPROMS", Int'l. Electron Devices Meeting, 1990, Technical Digest, Dec. 9-12, 1990, pp. 111-114.

* cited by examiner

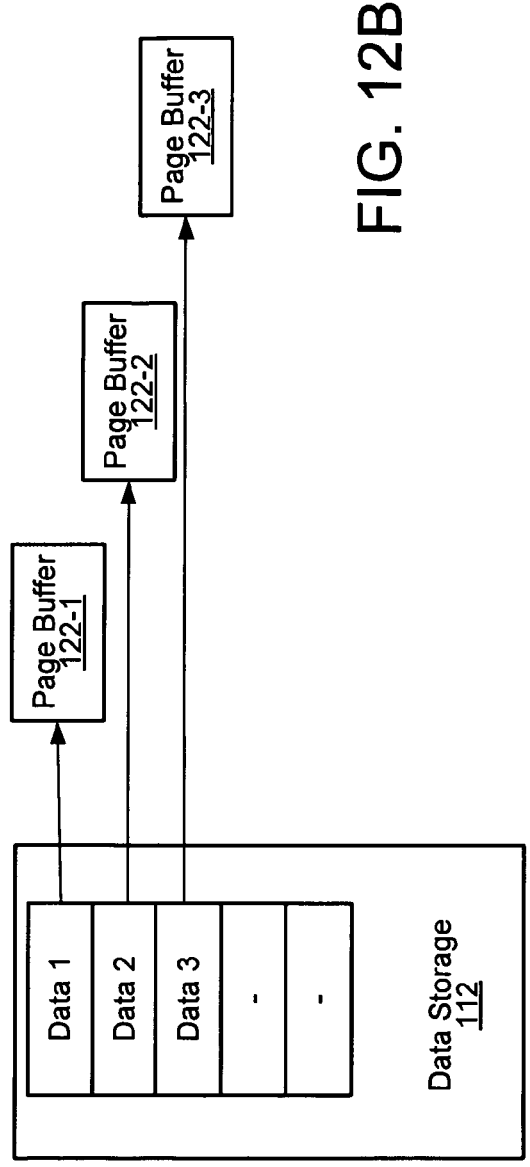
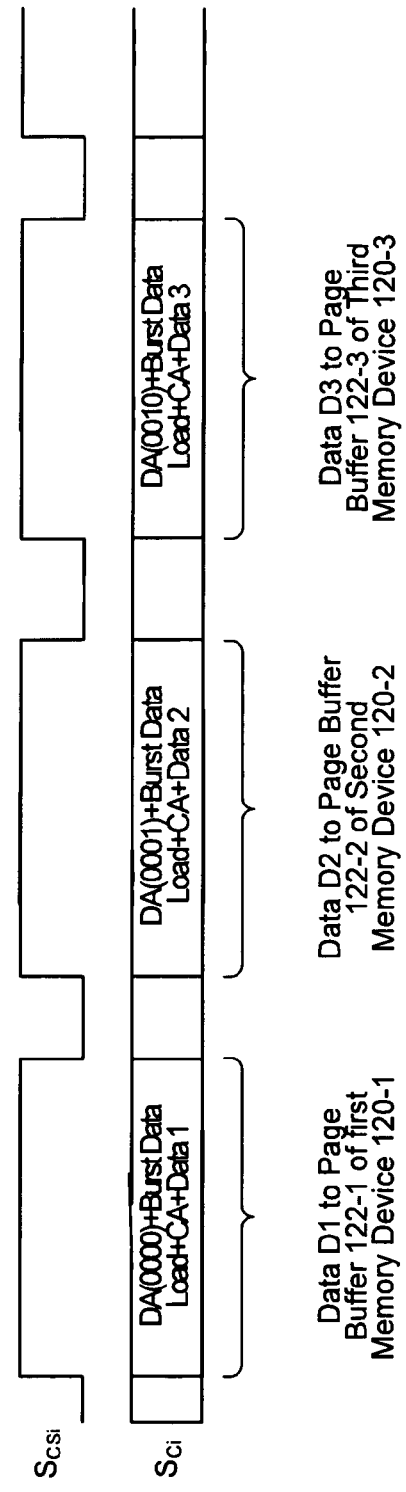
FIG. 12B
FIG. 12C

| Operation | DA (1 Byte) | OP Code (1 Byte) | Row Address (3 Bytes) | Column Address (2 Bytes) | Input Data (1 to 2112 Bytes) |
|---|---|---|---|---|---|
| Page Read | Valid | 0Xh | Valid | - | - |
| Page Read for Copy | Valid | 1Xh | Valid | - | - |
| Burst Data Read | Valid | 2Xh | - | Valid | - |
| Burst Data Load Start | Valid | 4Xh | - | Valid | Valid |
| Burst Data Load | Valid | 5Xh | - | Valid | Valid |
| Page Program | Valid | 6Xh | Valid | - | - |
| Block Erase Address Input | Valid | 8Xh | Valid | - | - |
| Page-pair Erase Address Input | Valid | 9Xh | Valid | - | - |
| Erase | Valid | AXh | - | - | - |
| Operation Abort | Valid | CXh | - | - | - |
| Read Device Status | Valid | D0h | - | - | - |
| Read Device Information Register | Valid | F1h. | - | - | - |
| Read Link Configuration Register | Valid | FEh | - | - | - |
| Write Link Configuration Register | FFh | FFh | - | - | Valid (1 Byte Only) |

FIG. 13

| /RST | /CE | CSI | DSI | Mode |
|---|---|---|---|---|
| H | L | H | L | Command Data Packet |
| H | L | L | H | Read Data Packet |
| H | L | L | L | NOP (NO Operation) |
| H | H | X | X | Standby |
| L | X | X | X | Reset |

FIG. 14

Command & Address Format

| | Bit7 | Bit6 | Bit5 | Bit4 | Bit3 | Bit2 | Bit1 | Bit0 |
|---|---|---|---|---|---|---|---|---|
| Command | | | | | | | | |
| 1st Byte | CA7 | CA6 | CA5 | CA4 | CA3 | CA2 | CA1 | CA0 |
| 2nd Byte | OP7 | OP6 | OP5 | OP4 | OP3[BA3] | OP2[BA2] | OP1[BA1] | OP0[BA0] |
| Row Address | | | | | | | | |
| 1st Byte | RA7 | RA6 | RA5 | RA4 | RA3 | RA2 | RA1 | RA0 |
| 2nd Byte | RA15 | RA14 | RA13 | RA12 | RA11 | RA10 | RA9 | RA8 |
| 3rd Byte | Low | Low | Low | Low | Low | Low | Low | RA16 |
| Column Address | | | | | | | | |
| 1st Byte | CA7 | CA6 | CA5 | CA4 | CA3 | CA2 | CA1 | CA0 |
| 2nd Byte | Low | Low | Low | Low | CA11 | CA10 | CA9 | CA8 |

FIG. 15

APPARATUS AND METHOD FOR USING A PAGE BUFFER OF A MEMORY DEVICE AS A TEMPORARY CACHE

CROSS REFERENCE TO RELATED APPLICATIONS

This application claims the benefit of prior U.S. Provisional Patent Application No. 60/891,115 filed Feb. 22, 2007, the disclosure of which is hereby incorporated by reference in its entirety.

FIELD OF THE INVENTION

The present invention relates generally to systems including memories. More particularly, the present invention relates to an apparatus and a method for using a memory as a temporary cache.

BACKGROUND OF THE INVENTION

Electronic equipment uses memory devices, such as, for example, flash memories, for storing data or information. A flash system including a flash controller and a plurality of flash memory devices "n" a multi-drop configuration is disclosed in U.S. Patent Application Publication No. 2006/0198202 A1 (Erez). The flash controller sends data to the memory devices and controls operations multiple memory devices. The flash controller employs a memory resource such as static random access memory (SRAM) therein for storing code and/data to execute operations in its central processing unit (CPU).

The memory controller typically has its own data storage, which is used for caching of data for various applications. Increasing the capacity of the data storage elements might be beneficial for some applications due to the increased caching capability by the memory controller. However, increasing the capacity of the data storage results in increased cost.

SUMMARY OF THE INVENTION

In accordance with an aspect of the present invention, there is provided a method for communicating with a plurality of memory devices connected in-series, at least one of the memory devices having a temporary store element, the method comprising: selecting a memory device of the plurality of memory devices, writing data stored in a data storage to the temporary store element of the selected memory device; and at a later time, reading the data from the temporary store element of the selected memory device.

The method may further comprise storing the read data back to the data storage. In the data storage, the space storing the data may be freed up after performing the step of writing.

Advantageously, the step of writing comprises: transmitting a write command including the data addressed to the selected memory device. The selected device writes the data to the temporary store element thereof in response to the write command.

The step of reading may comprise: transmitting a read command addressed to the selected memory device, the selected memory device reading the data from the temporary store element thereof in response to the read command; and receiving the read data through the last memory device of plurality of memory devices.

The method may further comprise selecting another memory device of the plurality of memory devices. The data may be written to the temporary store element of the another selected memory device. Later, the data may comprise a plurality of data parts including first and second data parts. The data parts may be temporarily stored separately and read back separately.

In accordance with another aspect of the present invention, there is provided an apparatus in communication with a plurality of memory devices connected in-series, each of the memory devices having a temporary store element, the apparatus comprising a processor for selecting a memory device of the plurality of memory devices, writing data in the temporary store element of the selected memory device; and reading back the data at a later time from the temporary store element of the selected memory device.

In accordance with a further aspect of the present invention, there is provided a system comprising: a plurality of memory devices connected in-series, each of the memory devices having a temporary store element and memory cells; and an apparatus for communicating with the plurality of memory devices. The apparatus comprises a processor for selecting a memory device of the plurality of memory devices, writing data in the temporary store element of the selected memory device; and reading back the data at a later time from the temporary store element of the selected memory device.

In accordance with an embodiment of the present invention, there is provided an apparatus for using a page buffer of a flash memory device as a temporary cache for data. A memory controller writes data to the page buffer and later reads out the data without programming the data into the memory cells of the flash memory device. This allows the memory controller to use the page buffer as temporary cache so that the data does not have to occupy space within the memory controller's local data storage. Therefore, the memory controller can free up space in its own storage to use the space for other operations or overwrite the occupied space with data for other operations.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments will now be described with reference to the attached drawings in which:

FIG. 12B is an illustration of the data transfers shown in FIG. 12A;

FIG. 12C is an example timing diagram for the data transfers in the system shown in FIG. 12A;

FIG. 13 is a table of an example command set;

FIG. 14 is a table of an example operation table;

FIG. 15 is a table showing an example of a detailed command and address format;

DETAILED DESCRIPTION

In the following detailed description of sample embodiments of the invention, reference is made to the accompanying drawings which form a part hereof, and in which is shown by way of illustration specific sample embodiments in which the present invention may be practiced. These embodiments are described in sufficient detail to enable those skilled in the art to practice the present invention, and it is to be understood that other embodiments may be utilized and that logical, mechanical, electrical, and other changes may be made without departing from the scope of the present invention. The following detailed description is, therefore, not to be taken in a limiting sense, and the scope of the present invention is defined by the appended claims.

Figure 1:
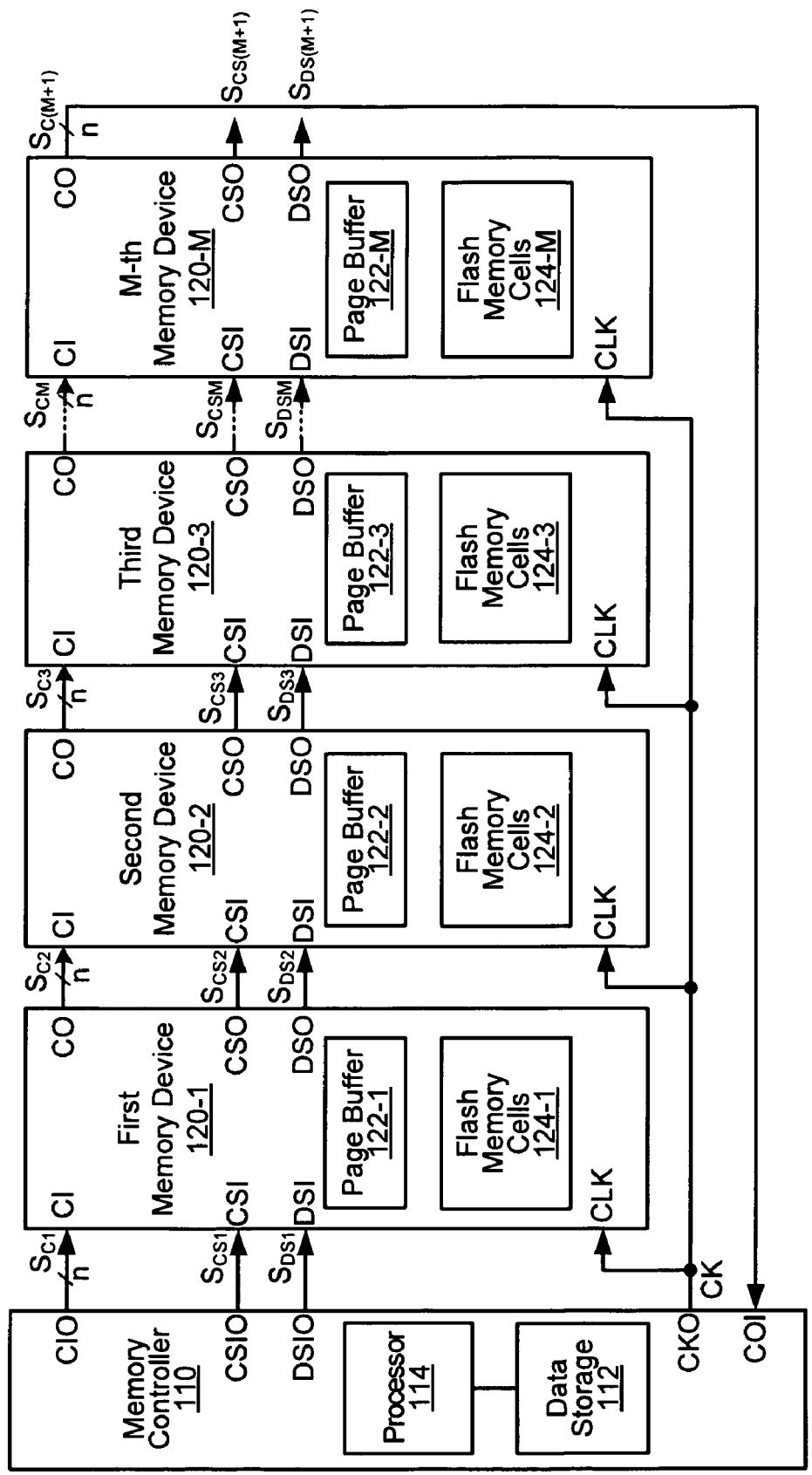
FIG. 1 is a block diagram of a system including a memory controller and a plurality of series-connected memory devices according to an embodiment of the present invention.

FIG. 1 shows a system according to an embodiment of the present invention. Referring to FIG. 1, the system includes a memory controller 110 and a serial interconnection of a plurality (M) of memory devices 120-1, 120-2, 120-3, . . . , and 120-M that are connected in-series, M being an integer greater than one. The memory controller 110 and the memory devices are interconnected via links having data width n, where n is an integer greater than or equal to one. In a case of n being one, the interconnection link will be a serial link and in a case of n being more than one, the interconnection link will be a parallel link. The memory controller 110 is connected to the first memory device 120-1 of the serial interconnection. The last memory device 120-M is also connected to the memory controller 110 so that first, second, third, . . . , and M-th memory devices 120-1, 120-2, 120-3, . . . , and 120-M of the serial interconnection together with the memory controller 110 form a ring connection structure. In the illustrated example, the memory devices 120-1-120-M are flash memory devices. Subsequent examples are also specific to flash memory. However, it is to be understood that embodiments of the present invention are also applicable to other types of non-volatile memory devices.

In the particular example shown in FIG. 1, each of the series-connected memory devices 120-1-120-M is a flash memory device, such as, for example, a NAND flash device. The flash memory device has a page buffer for temporary storing information on data. The stored information is written into flash memory cells of the device in accordance with page programming. Once programmed, the information stored in the page buffer is corrupted due to the verification process of the programmed cells.

The memory controller 110 has a data storage 112 and a processor 114. The data storage 112 stores various data that includes information on operation instructions, addresses and memory data to be processed and to be stored in the series-connected memory devices. The information on operation instructions is used for controlling the series-connected memory devices. The data storage 112 is, for example, a static random access memory (SRAM) or any type of embedded memory. More generally, any appropriate data storage may be implemented. The processor 114 performs operations of data processing and controlling of the memory devices accessing the data stored in the data storage 112.

In operation, the memory controller 110 sends a command input (CI) signal $S_{C1}$ to the first device 120-1 and receives a command output (CO) signal $S_{C(M+1)}$ from the last device 120-M of the serial interconnection. Also, the memory controller 110 provides a command strobe input (CSI) signal $S_{CS1}$ and a data strobe input (DSI) signal $S_{DS1}$ to the first device 120-1 and provides a clock signal CK to all of the devices 120-1-120-M in a common clock source fashion.

The memory controller 110 has a plurality of connections: a command signal output connection CIO for sending the CI signal $S_{C1}$; a command signal input connection COI for receiving the CO signal $S_{C(M+1)}$; an input strobe connection CSIO for sending the CSI signal $S_{SC1}$; an output strobe connection DSIO for sending the DSI signal $S_{DS1}$; and a clock output connection CKO for providing the clock signal CK.

The memory devices 120-1, 120-2, 120-3, . . . , and 120-M have page buffers 122-1, 122-2, 122-3, . . . , and 122-M, respectively, and flash memory cells 124-1, 124-2, 124-3, . . . , and 124-M, respectively. Each of the memory devices 120-1-120-M has a signal input connection CI for receiving the CI signal $S_{Ci}$ (i=1 to M) from a previous device; a signal output connection CO for providing the CI signal $S_{C(i+1)}$ to a succeeding device; an input strobe input connection CSI for receiving the CSI signal $S_{CSi}$ from a previous device; an input strobe output connection CSO for sending an output CSI signal $S_{CS(i+1)}$ to the succeeding device; an output strobe input connection DSI for receiving the DSI signal $S_{DSi}$ from the previous device; and an output strobe output connection DSO for sending an output DSI signal $S_{DS(i+1)}$ to the succeeding device.

Each of the memory devices 120-1-120-M has a unique device address (DA) that is hard wired or pre-assigned, so that one device can be selected or designated at a time in normal operation. Example details of an architecture featuring devices connected in-series are provided in U.S. patent application Ser. No. 11/594,564 entitled "Daisy Chain Cascading Devices" filed Jul. 31, 2006, the disclosure of which is hereby incorporated by reference in its entirety. Other example details of an architecture feature devices connected in-series are provided in U.S. Provisional Patent Application Ser. No. 60/868,773 entitled "System and Method of Operating Memory Devices of Varying Type" filed Dec. 6, 2006, the disclosure of which is hereby incorporated by reference in its entirety. Examples of the device address assignment in a plurality of memory devices that are connected in-series are provided in U.S. Provisional Patent Application No. 60/787,710, filed Mar. 28, 2006; U.S. patent application Ser. No. 11/521,734 filed Sep. 15, 2006; U.S. Provisional Patent Application No. 60/802,645, filed May 23, 2006; and U.S. patent application Ser. No. 11/750,649 filed May 18, 2007, the disclosures of which are incorporated by reference in their entirety.

In the normal operation, the memory controller 110 sends the CI signal $S_{CI}$ containing commands. A command includes a device address (DA) and an operation code (hereinafter OP code) representing an operation instruction. Some commands additionally include address information, and some commands additionally include data. Each OP code is associated with a respective operation. Each command is also referred to herein as having a type that is associated with the OP code contained in the command. For example, a command containing a read OP code is referred to as a "read command". Each of the memory devices 120-1-120-M receives commands via its respective CI either directly from the memory controller in the case that a given device is the memory device connected directly to the memory controller (device 120-1 in the illustrated example), or from an adjacent preceding memory device for other devices. Each of the memory devices 120-1-120-M uses its respective CO for forwarding on commands either to the memory controller 110 in the case that a given device is the one having its output connected to the memory controller (device 120-M in the illustrated example), or to an adjacent following device. A command containing a write OP code addressed to a particular flash memory device results in data being written to a page buffer of that device, and then transferred from the page buffer to the flash memory cells of the memory device. A command containing a read OP code addressed to a particular flash memory device results in data being read from the flash memory cells of the memory device to the page buffer of the memory device and then being transferred out of the page buffer.

The memory controller 110 uses the page buffer of a memory device as a temporary cache for data. For example, the memory controller 110 uses the page buffer of a selected memory device as a temporary cache for data when the selected memory device is not presently being used for page programming or page read operations. Note that the selected memory device can be any one of the memory devices 120-1-120-M and is selected by the memory controller 110. Since the data is stored in the page buffer of the selected memory device, the memory controller 110 does not need to locally store the data in the data storage 112 of the memory controller 110. This allows the memory controller 110 to free up space in its data storage 112 that can otherwise be used for storing the data. The memory controller 110 can later read back the data from the page buffer of the selected memory device (the temporary cache) without programming the data into the memory cells of the selected memory device. In this manner, the page buffer of the selected memory device is accessed independently of the program operation. Note that the data may be in respect of any appropriate application in which there is data to be maintained.

In order for the page buffers to operate as temporary caches, three "modular" memory access commands are used. The first is referred to as a "burst data load" command and contains a burst data load OP code. This causes data to be written to the page buffer of a memory device, but this command alone does not cause the data to be transferred to the flash memory cells of the memory device. In the examples that follow, 4Xh and 5Xh are used for this purpose, but more generally the command structure would be defined on an implementation specific basis. The second is referred to as a "burst data read" command and contains a burst data read OP code. This causes data to be read directly from the page buffer without first reading from the flash memory cells. In the examples that follow, 2Xh is used for this, but more generally, the command structure would be defined on an implementation specific basis. The third is referred to as a "page program" command and contains a page program OP code. This causes data that was previously stored in the page buffer to be written to the flash memory cells, destroying the contents of the page buffer in the process for verification purposes. In the examples that follow, 6Xh is used for this, but more generally, the command structure would be defined on an implementation specific basis.

In the embodiments, a flexible modular command structure is used. An example command format is detailed

TABLE I

| DA | OP Code | RA | CA | DATA |
|---|---|---|---|---|
| 1 byte | 1 byte | 3 bytes | 2 bytes | 1-2112 bytes |

In Table I, DA is a device address; OP code is an operation code; RA is a row address; CA is a column address; and DATA is write data. Examples of commands associated with OP codes are a "burst data load" command and a "burst data read" command. There are cases of: (i) either of row address or column address; (ii) neither row address nor column address; (iii) no data.

A particular example of the above-referenced command structure is provided in commonly assigned and co-pending U.S. patent application Ser. No. 11/840,692 filed Aug. 17, 2007 and U.S. Provisional Patent Application No. 60/892,705 filed Mar. 2, 2007, the contents of which are hereby incorporated by reference in their entirety. The applications disclose different command structures to distinguish core access operations that involve relatively long processing times from page buffer access operations that involve relatively short access times. Further details of the modular command structure will be later described with reference to FIGS. 13 to 21.

Figure 2:
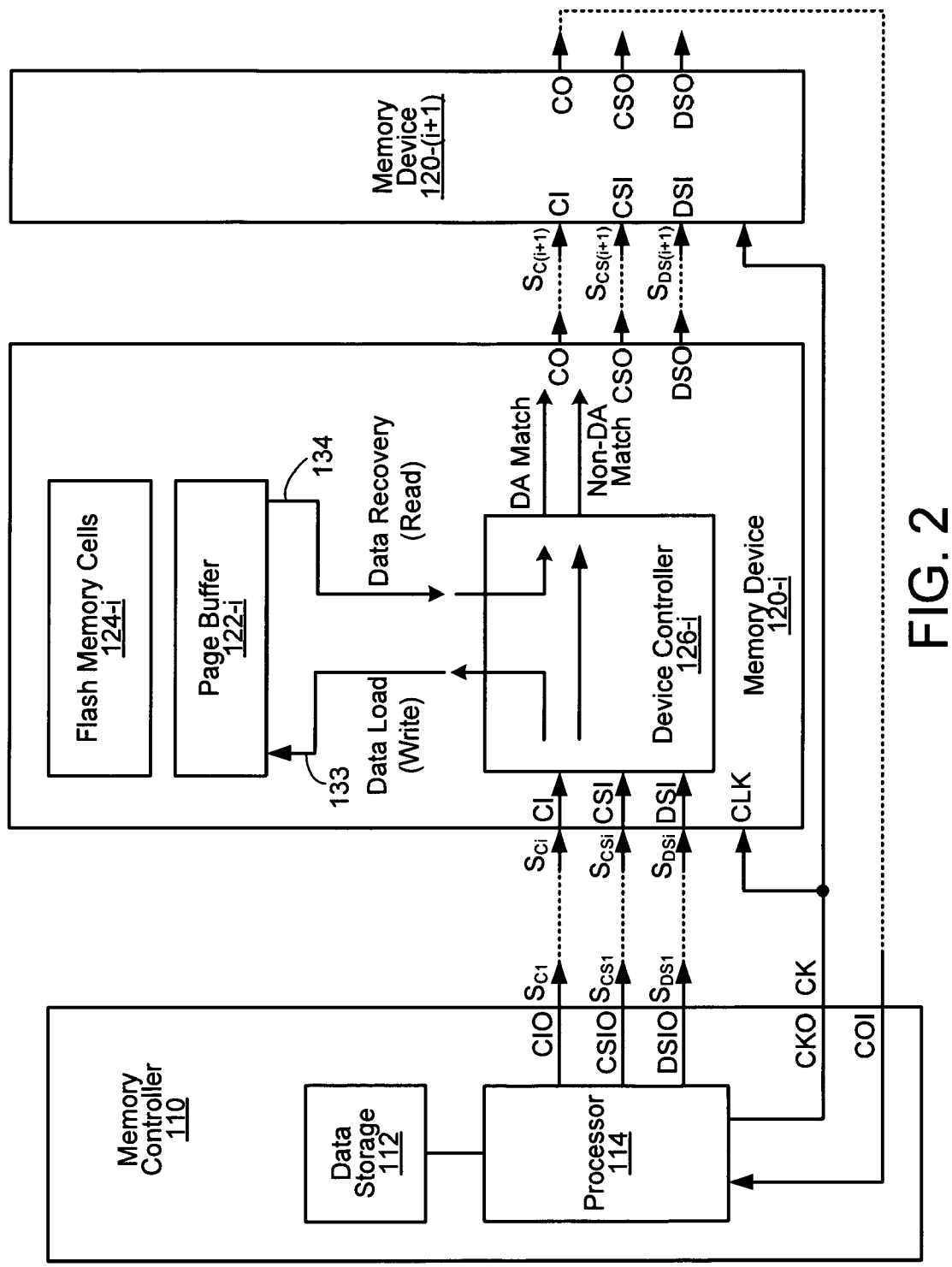
FIG. 2 is a block diagram of one of the memory devices shown in FIG. 1.

FIG. 2 shows one of the series-connected memory devices shown in FIG. 1. Referring to FIG. 2, a present memory device 120-$i$ having a page buffer 122-$i$ that can be used as a temporary cache for page read or other operations using a cache function. The memory device 120-$i$ could be any one of the series-connected memory devices. The memory device 120-$i$ includes the page buffer 122-$i$, the flash memory cells 124-$i$ and a device controller 126-$i$. The page buffer 122-$i$ is available for use both as a temporary cache and for the normal function of programming to the flash memory cells 124-$i$. The device controller 126-$i$ includes any appropriate circuitry for facilitating processing of commands. It is to be understood that the device controller 126-$i$ would include circuitry for processing commands.

In the normal operation, the memory controller 110 can transmit data to the page buffer 122-$i$ without restriction to page programming. Data is written to the page buffer 122-$i$ by the burst data load command as indicated at 133, and at a later time read by the burst data read command as indicated at 134. Note that when a temporary cache operation is performed, page programming is not performed. Therefore, the page buffer 122-$i$ can be accessed relatively quickly. In this manner, the page buffer 122-$i$ can be used as a temporary cache for data and/or instruction.

The device controller 126-$i$ performs a device address match determination and data process. Thus, in the "write" operation, the device controller 126-$i$ determines a device address match and loads the data of the input command to the page buffer 122-$i$ in a case of the device addresses match. If the device addresses do not match, the device controller 126-$i$ forwards the input command to the next memory device 120-($i$+1). Also, in the "read back" operation, the device controller 126-$i$ determines a device address match, the data is read from the page buffer 122-$i$ and the read data is transferred to the next memory device 120-($i$+1). If no device address match, the device controller 126-$i$ forwards the input command to the next memory device 120-($i$+1). The read data is propagated through the rest of the memory devices connected in-series and back to the memory controller 110.

Figure 3A:
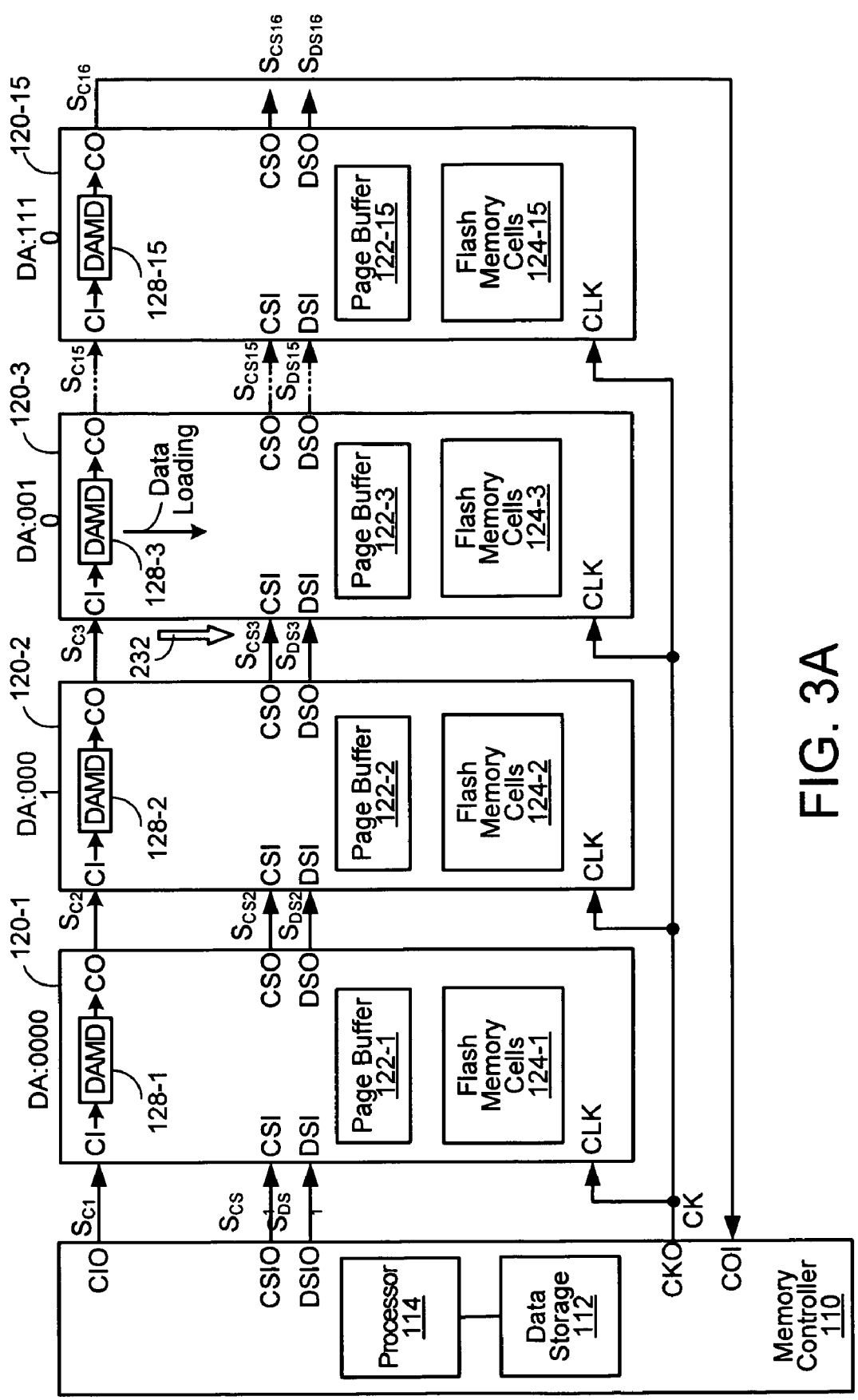
FIG. 3A is a block diagram of the system shown in FIG. 1 wherein a data transfer is performed for a temporary cache.
Figure 3B:
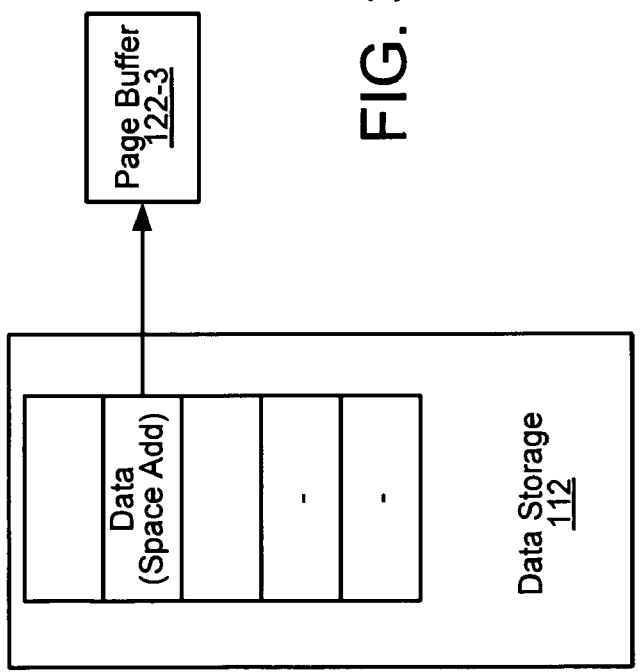
FIG. 3B is an illustration of the data transfer shown in FIG. 3A.

A specific example of the temporary cache function of the page buffer for an architecture with series-connected devices will now be described with reference to FIG. 3A. FIG. 3A shows the system of FIG. 1 with emphasis of temporary cache for data. FIG. 3B illustrates the data transfer shown in FIG. 3A;

Referring to FIGS. 3A and 3B, the memory controller 110 and the memory devices 120-1, 120-2, 120-3, . . . , and 120-15 are connected in a ring structure. The signal issued by the memory controller 110 is propagated through the series-connected devises and the propagated signal is fed from the last device to the memory controller 110. In the particular example shown in FIG. 3A, the number M of the memory devices that are addressed with such a four bit numbering scheme is 15(=$2^4$–1). Alternatively, the system can include any number of memory devices connected in-series and appropriate DAs are assigned accordingly. Referring to FIG. 3A, the device addresses DAs of the memory devices 120-1, 120-2, 120-3, . . . , and 120-15 are '0000', '0001', '0010', . . . , and '1110', respectively. The DAs are assigned with four bit binary numbers or values.

Each of the memory devices includes a device address match determiner (DAMD) for determining whether the device address DA contained in the input command matches the device address assigned to that device. The assigned address to each device is held in a register (not shown) thereof. In FIG. 3A and succeeding figures, the device address match determiners are shown instead of the device controllers in the respective memory devices. The device address match determiner is part of circuitry that forms the device controller of each memory device shown in FIG. 2. As shown in FIG. 3A, the memory devices 120-1, 120-2, 120-3, . . . , and 120-M have device address match determiners 128-1, 128-2, 128-3, . . . , and 128-15, respectively.

Figure 4:
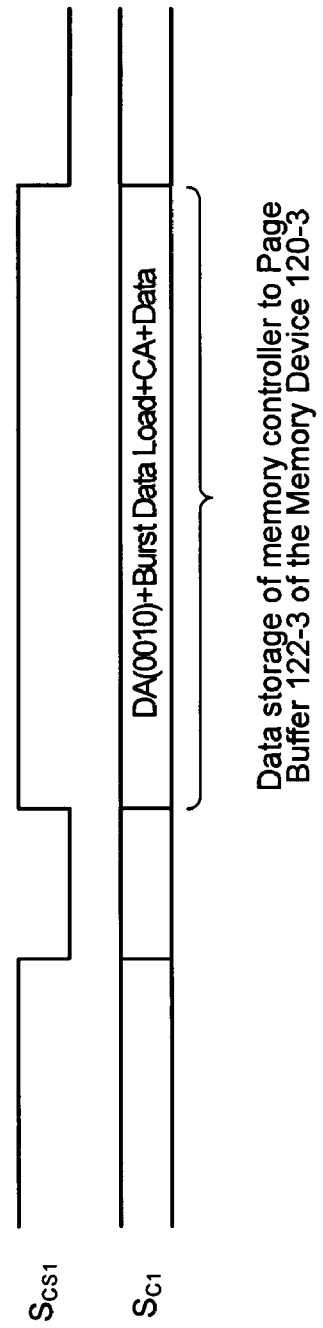
FIG. 4 is an example timing diagram for the data transfer in the system shown in FIG. 3A.

An example of data transfer signals used in the system of FIG. 3A to achieve a temporary cache function is shown in FIG. 4. In the system shown in FIG. 3A, it is assumed that the page buffer 122-3 of memory device 120-3 is available for use as a temporary cache.

FIG. 4 shows an example timing diagram for the data transfer in the system shown in FIG. 3A. Referring to FIGS. 3A and 4, each command sent from the data storage elements of the memory controller 110 is addressed to (or designated) specific memory device using the device address DA. In this particular example, the third memory device 120-3 is designated and selected. The memory controller 110 transmits a command that is a burst data load command containing the DA ('0010') of the third memory device 120-3 together with address information and data. This is transmitted along the devices connected in-series and each device will recognize a command if it is addressed to itself. Each of the first and second memory devices 120-1 and 120-2 is not selected. The command is processed by the third memory device 120-3 and the data in the command is stored in page buffer 122-3 of the memory device 120-3. In this example, the data transmission is via a 'Burst Data Load' OP code. Without additional command assertion, after the two 'Burst Data Load' commands, the page buffer 122-3 holds the data. After transmitting the data to the designated device 120-3, the flash memory controller 110 can switch the contents of the data storage 112 in order to start new operations, such as another page program or a page read.

In performing the transfer to the page buffer of a memory device, a command strobe input (CSI) signal $S_{CSI}$ and a command input (CI) signal $S_{CI}$ are provided by the memory controller 110. The CSI signal and the CI signal are propagated through the series-connected devices. The propagated CSI signal and CI signal are shown as $S_{CSi}$ and $S_{Ci}$, respectively.

To write to the page buffer 122-3 of the third memory device 120-3, the CI signal $S_{Ci}$ contains the third device's DA (0010), operation instruction ("Burst Data Load") represented by OP code, column address CA and data to be written. When the CSI signal $S_{CS3}$ is asserted to enable the input (i.e., the CI signal $S_{C3}$) to the third memory device 120-3, the device address match determiner 128-3 determines the device address match. Thus, the third device 120-3 is a designated device to be selected. Note that the data transfer to the third designated memory device 120-3 involves a third 'Burst Data Load' OP code addressed to the third designated memory device 120-3, which has an address of "0010" in this example. In the particular example, during the CSI signal being asserted for the third device, the data is transferred from the data storage 112 of the memory controller 110 to the page buffer 122-3 of the designated device 120-3 as indicated by 232 in FIG. 3A.

A similar transfer is performed for another designated memory device. In another implementation, a single command is issued for writing the same data to more than one memory device. Multiple or all device selection is possible by proper device designation by command or other means. In such example, during the CSI signal $S_{CSi}$ being asserted for the other device, the data is transferred from the data storage 112 of the memory controller 110 to the page buffer of the designated device.

Figure 5:
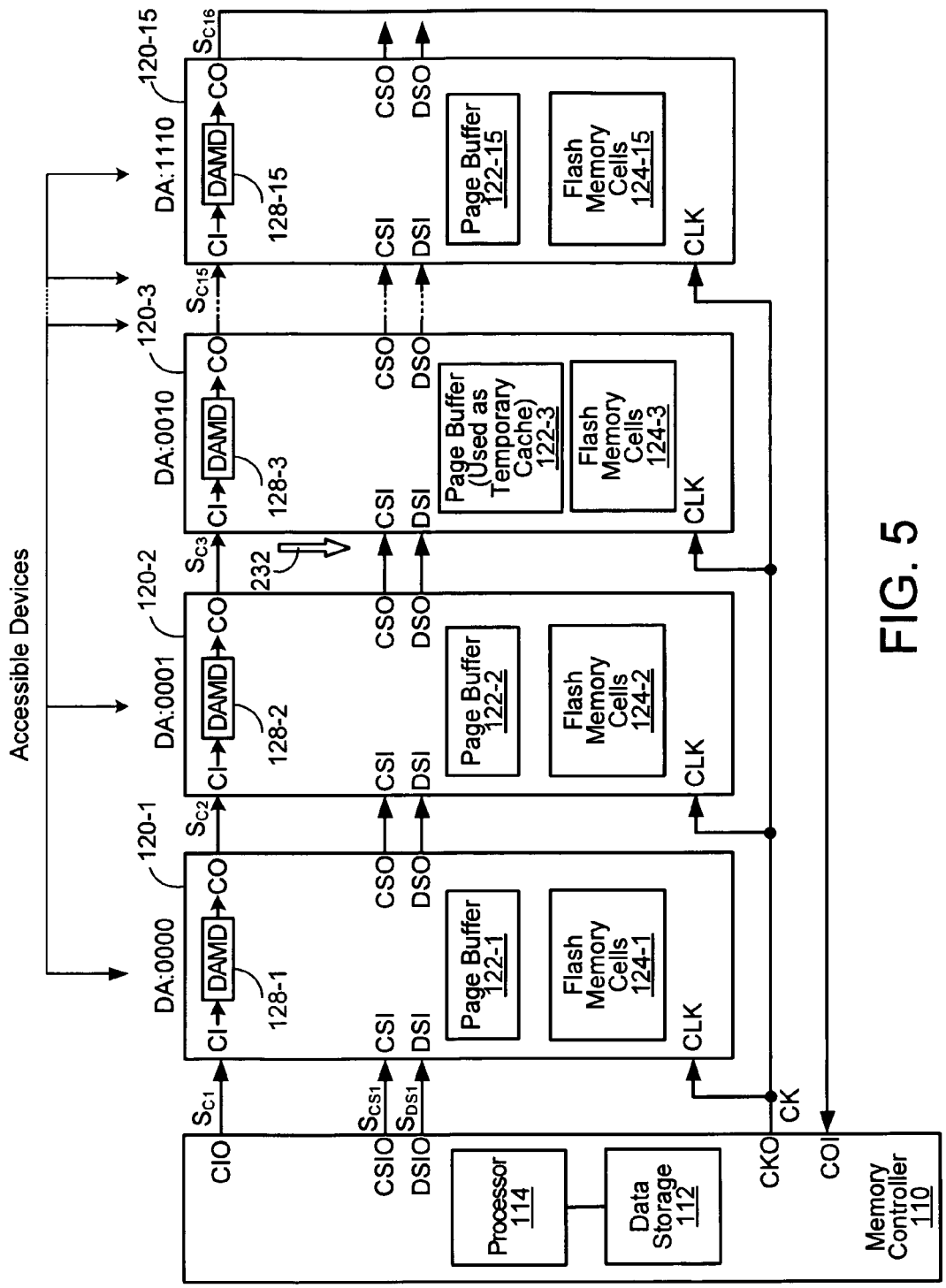
FIG. 5 is a block diagram of the system of FIG. 3A wherein memory devices are accessible after the data transfer.

FIG. 5 shows the system of FIG. 3A with accessible devices after the data transfer. In the illustrated example, it is assumed that the page buffer 122-3 of the designated memory device 120-3 is being used as a temporary cache for data and is therefore inaccessible. The other memory devices 120-1, 120-2 and 120-4-120-15 are considered accessible devices because there is no data stored in page buffers 122-1, 122-2 and 122-4-122-15 that needs to be maintained. While the memory device 120-3 is inaccessible in terms of core memory utilization, it may be accessible for other purposes. For example, the memory device 120-3 can be accessed in case of register read and write operations like 'Read Status Register' and 'Write Configuration register'. The contents of the temporary cache 122-3 can be changed at any time, or modified in part or in whole depending on the memory controller 110. If the temporary cache 122-3 is not needed any more, then it can be used as a page buffer much like the other page buffers. It is the responsibility of the memory controller 110 to remember which page buffers are being used as a temporary cache. In the event that data needs to be read or written from one of the inaccessible memory devices, it is possible to move the contents of the page buffer of the inaccessible device to the page buffer of another device that is not currently requiring access.

Figure 6:
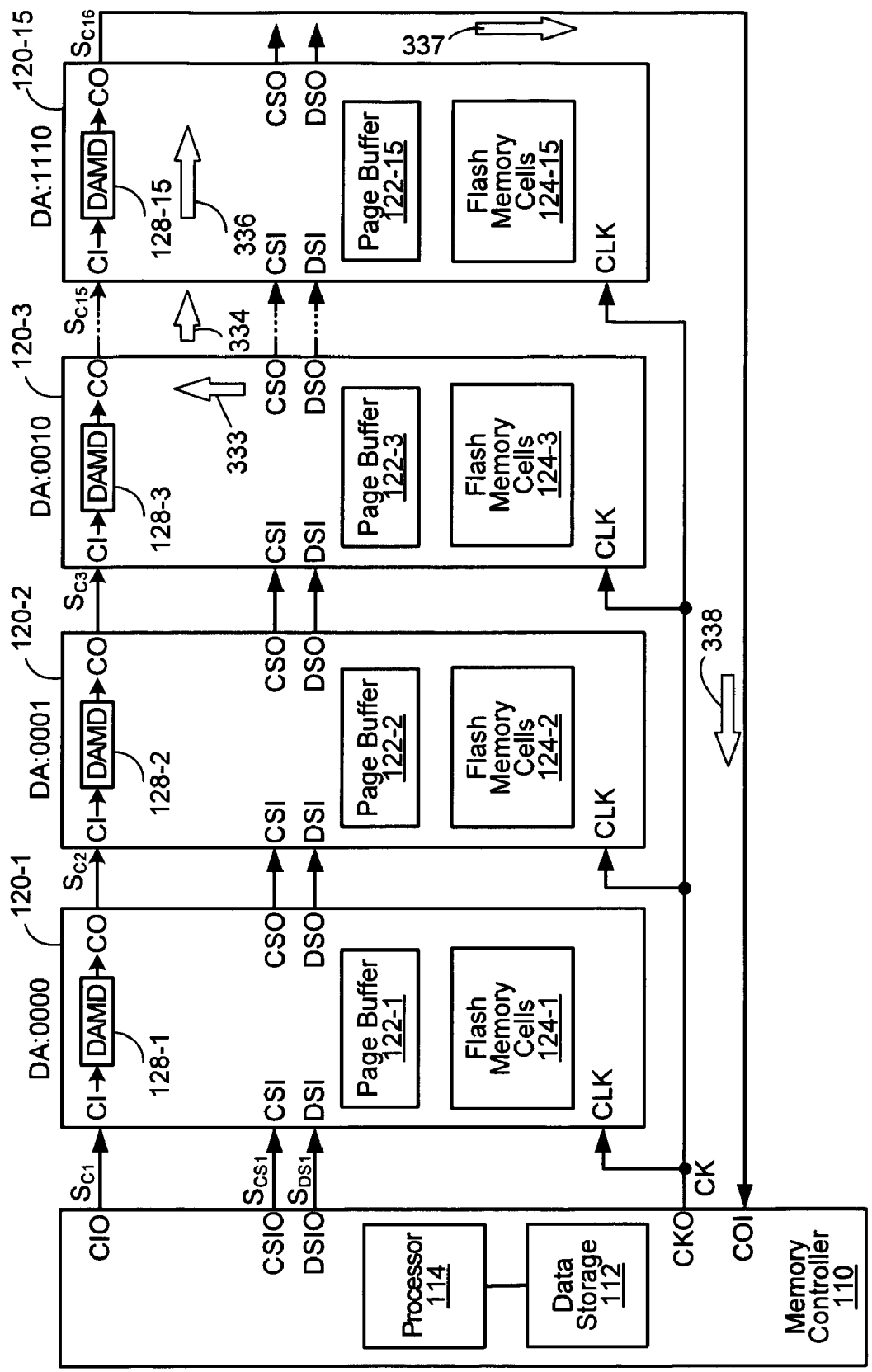
FIG. 6 is a block diagram of the system of FIG. 3A wherein a data recovery from a temporary cache is performed.

FIG. 6 shows the system of FIG. 3A performing data recovery (read back) from the temporary cache 122-3. The data recovery includes a data path as indicated by 333, 334, 336, 337 and 338. In this example, that the data is read from the temporary cache 122-3 of the third memory device 120-3 having the address "0010" to the data storage 112 of the flash memory controller 110. The data can be read out using the 'Burst Data Read' OP code. This data can optionally then be written to another page buffer.

Figure 7:
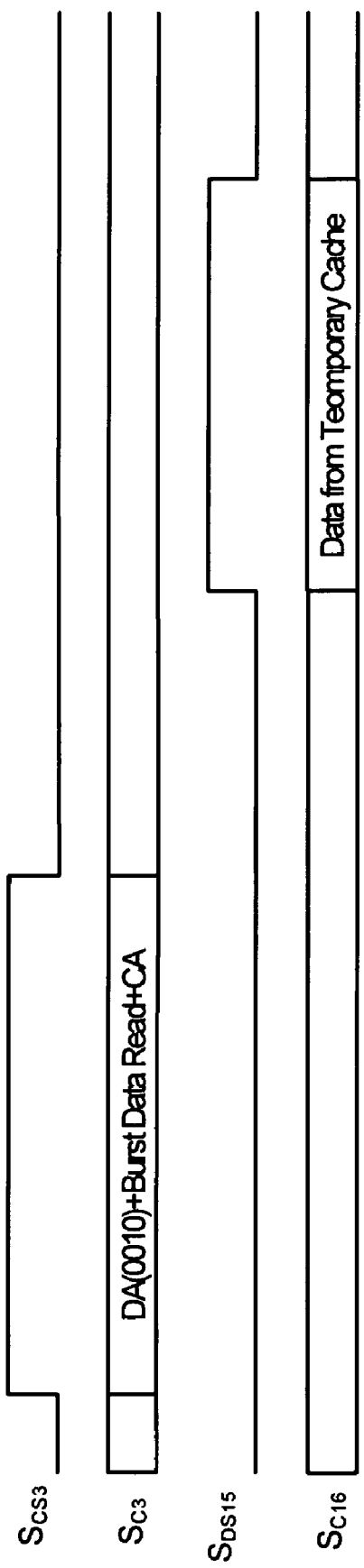
FIG. 7 is an example timing diagram for the data recovery from the temporary cache in the system shown in FIG. 6.

FIG. 7 shows an example of signaling for the data recovery from the temporary cache 122-3 of the third memory device in the system shown in FIG. 6. A CSI signal $S_{CSI}$ and a DSI signal $S_{DSI}$ are sent from the memory controller 110 along with a CI signal $S_{CI}$. The CSI signal, the DSI signal and the CI signal are propagated through the series-connected devices. The propagated CSI signal, DSI signal and CI signal are shown as $S_{CSi}$, $S_{DSi}$ and $S_{Ci}$, respectively. As such, a read request is transmitted by asserting the CSI signal $S_{CSi}$ while the CI signal $S_{Ci}$ carries the command. The command traverses the first and second memory devices 120-1 and 120-2 to get to the third memory device 120-3 addressed by the read request. In response to the read request and the assertion of the input CS signal $S_{CS3}$ and DS signal $S_{DS3}$, the memory device 120-3 provides the data as the output CI signal $S_{C3}$ from the temporary cache 122-3. The data is propagated along the data path 333, 334, 336, 337 and 338 to the data storage 112 of the memory controller 110. The memory controller 110 receives the read data via the output CI signal $S_{C16}$ from the last device 120-15.

Figure 8:
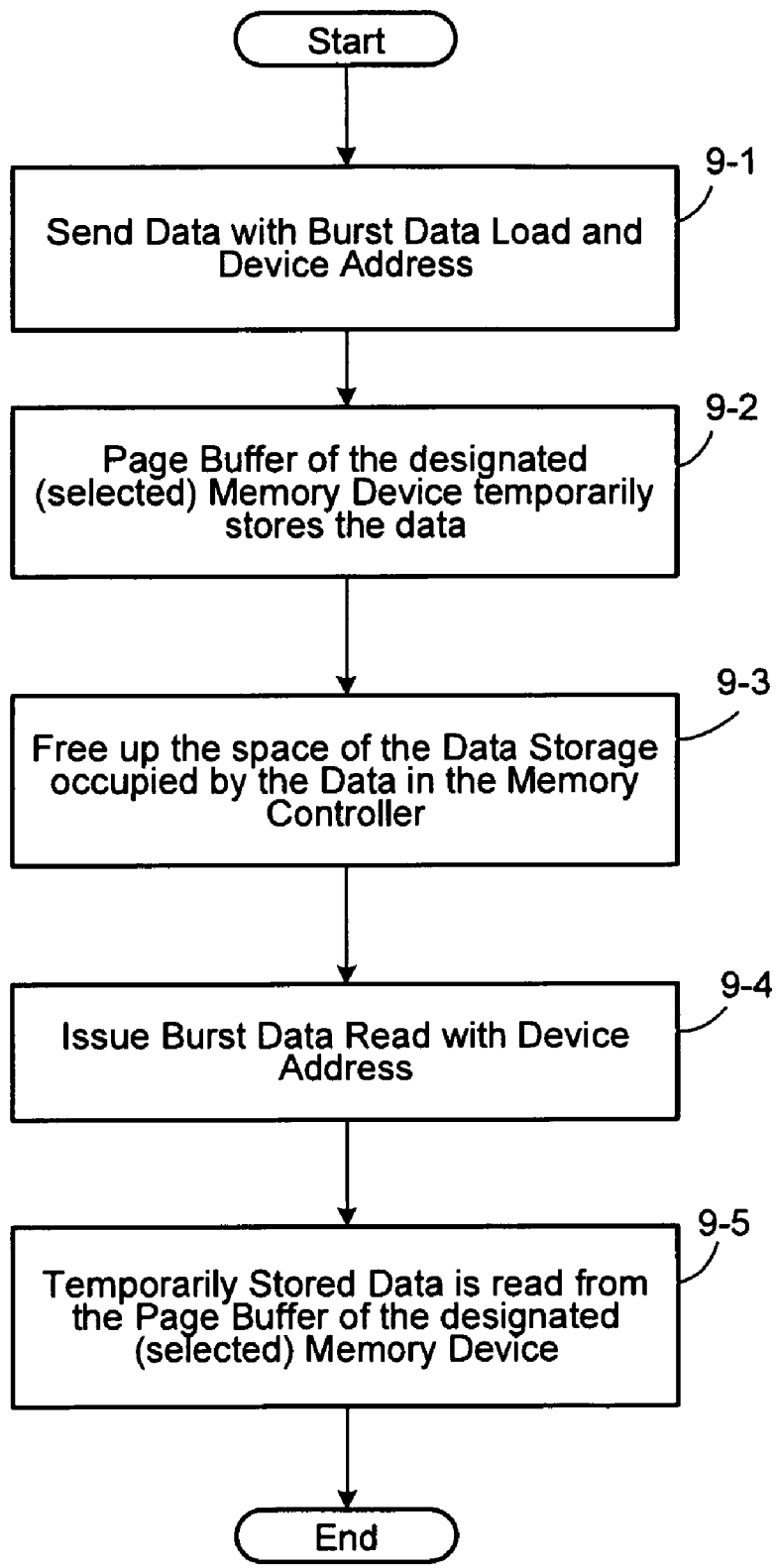
FIG. 8 is a flowchart of an example method for using a page buffer as a temporary cache in the system of FIG. 3A.

FIG. 8 shows a method for using a page buffer as a temporary cache in the system of FIG. 3A. This method can be implemented in a memory controller, for example by the memory controller 110 shown in FIG. 3A. Referring to FIGS. 3A and 8, the memory controller 110 issues a 'Burst Data Load' OP code with data along with a device address for a designated memory device (step 9-1). The third device 120-3 is designated and selected in accordance with the device address DA. The data is stored in the page buffer 122-3 of the selected memory device 120-3 (step 9-2). Later, when the data stored in the temporary cache is required to be read back, the memory controller 110 sends the read command. The command containing the OP code for 'Burst Data Read' is issued, together with the DA ("0010"). Upon device address match determination, the memory device 120-3 processes the command and the data is read (step 9-3) and the read data is sent back to the memory controller 110 through the remaining memory devices.

Figure 9A:
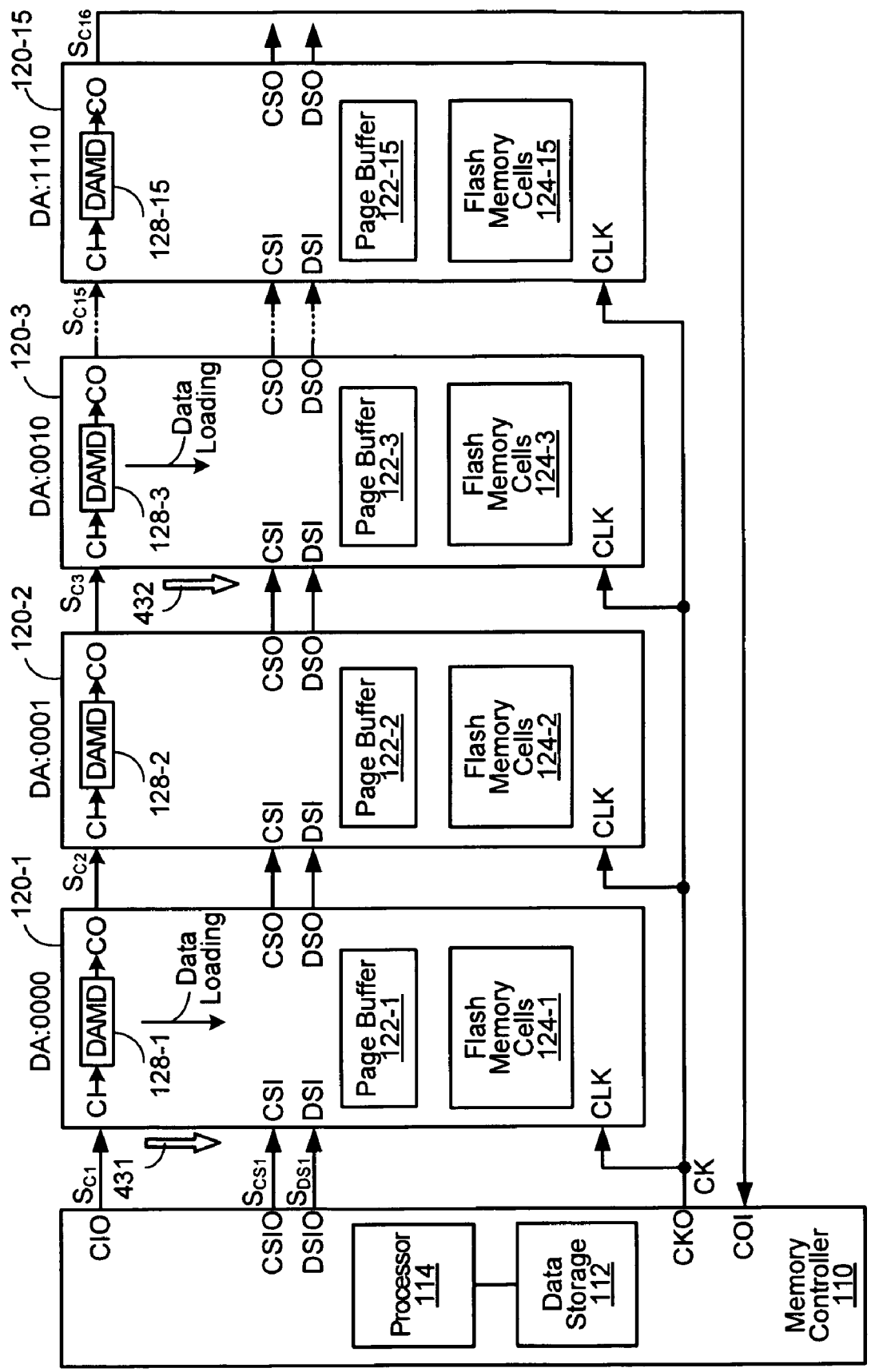
FIG. 9A is a block diagram of the system of FIG. 3A wherein two data transfers are performed for a temporary cache.
Figure 9B:
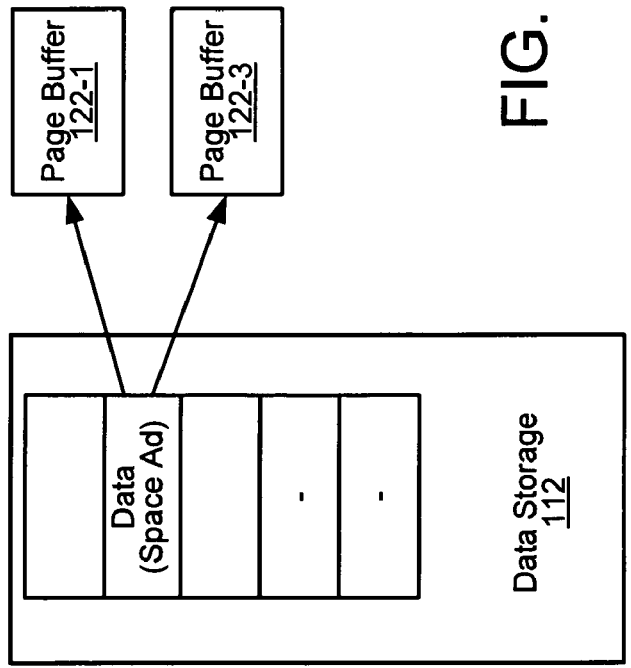
FIG. 9B is an illustration of the data transfers shown in FIG. 9A.
Figure 10:
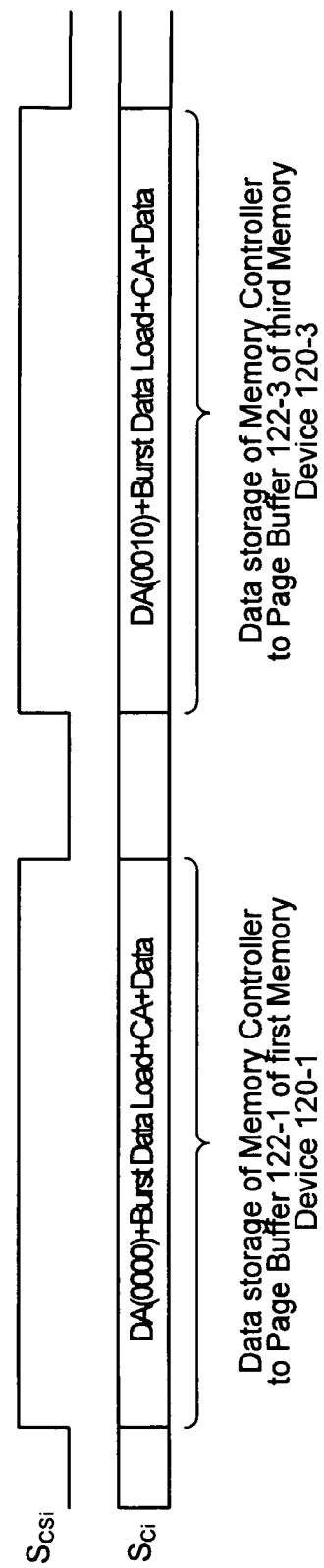
FIG. 10 is an example timing diagram for the data transfers in the system shown in FIG. 9A.
Figure 11:
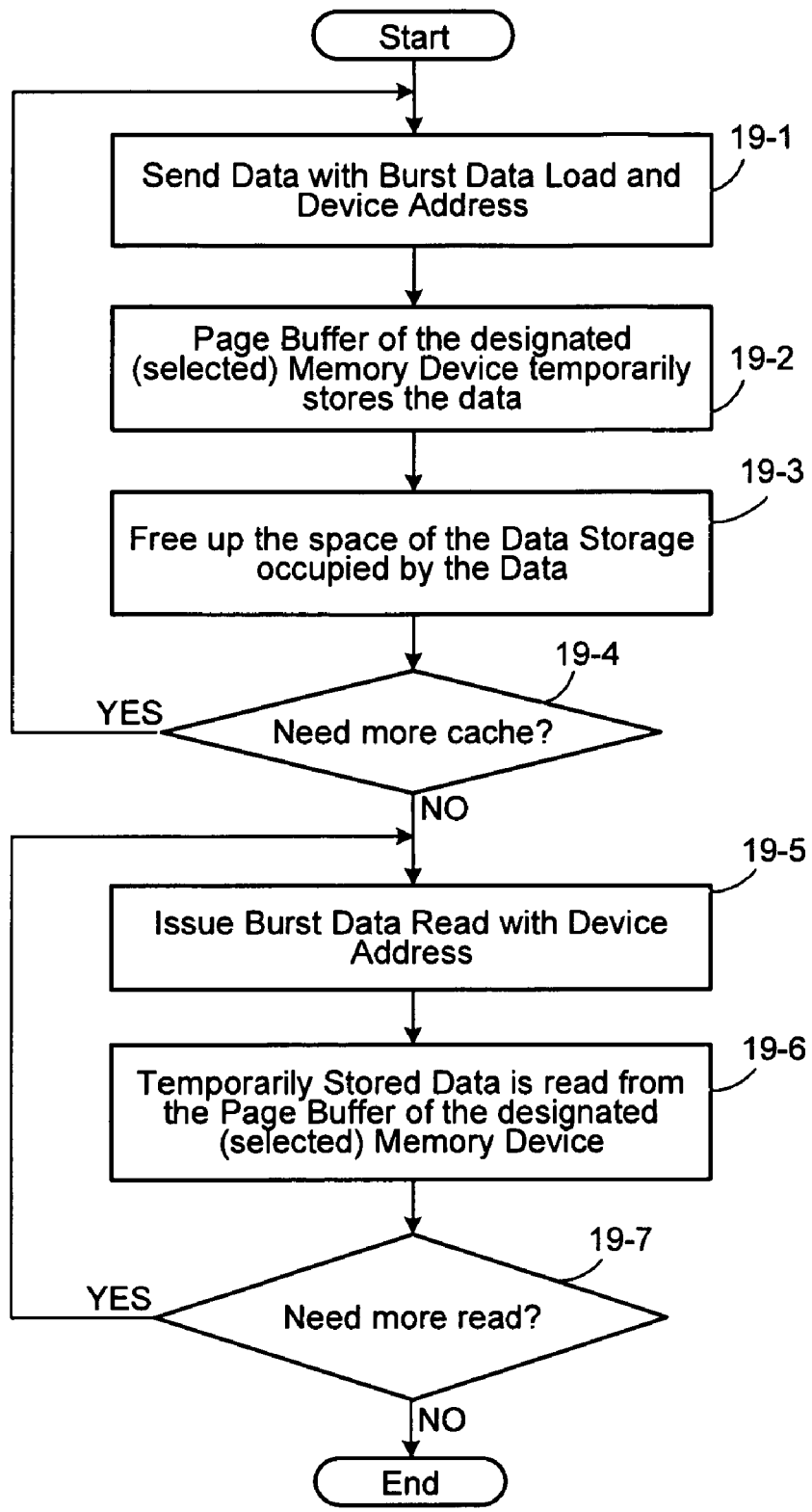
FIG. 11 is a flowchart of an example method for using more than one page buffer of memory device as temporary caches in the system of FIG. 3A.

FIG. 9A shows the system of FIG. 3A wherein two data transfers are performed for temporary cache for data. In this particular example, the same data is temporarily stored in the page buffers of two memory devices. FIG. 10 shows timing for the data transfers in the system shown in FIG. 9A. FIG. 11 shows an example method for using the page buffers shown in FIG. 9A. FIG. 9B illustrates the data transfers shown in FIG. 9A;

Referring to FIGS. 3A, 9A, 9B and 10-11, the memory controller 110 issues a 'Burst Data Load' OP code with data along with a device address DA (0000) for a designated memory device (step 19-1). The first device 120-1 is designated and selected in accordance with the device address DA. The data is stored in the page buffer 122-1 of the selected memory device 120-1 (step 19-2). Then, the memory controller 110 determines whether more cache needs (step 19-3). In this case, another cache is necessary (YES at step 19-3), the memory controller 110 issues again a 'Burst Data Load' OP code with data along with a device address DA (0010) for a designated memory device (step 19-1). The third device 120-3 is designated and selected in accordance with the device address DA. The data is stored in the page buffer 122-3 of the selected memory device 120-3 (step 19-2). No more cache is necessary (NO at step 19-3) and temporary store of the data is completed.

Later, when the data stored in any one of the temporary caches is required to be read back, the memory controller 110 sends the read command. The command containing the OP code for 'Burst Data Read' is issued, together with the device address for designating the temporary cache. For example, the data temporary stored in the page buffer 122-1 of the first memory device 120-1 is read back. In such a case, the device address DA ("0000") with the read OP code is sent by the memory controller 110. Upon device address match determination, the memory device 120-1 processes the command and the data is read and the read data is sent back to the memory controller 110 through the remaining memory devices (step 19-4). If reading back of the data temporarily stored in one page buffer is sufficient, no more reading will be necessary (NO at step 19-5) and reading back operation is completed. However, for any reason, another reading back of the data is required (YES at step 19-5), the memory controller 110 sends the command containing the device address DA (0010) and the OP code for 'Burst Data Read'. The data temporarily stored in the page buffer 122-3 of the third memory device 120-3 is read back (step 19-4). If the second reading back of the data temporarily stored in the page buffer is sufficient, no more reading will be necessary (NO at step 19-5) and reading back operation is completed.

It would be apparent that the data from data storage 112 of the memory controller 110 can be temporarily stored in more than two temporary caches. The data can be read back from any one of the temporary caches.

Alternatively, two or more different data can be loaded in two or more temporary caches.

Figure 12A:
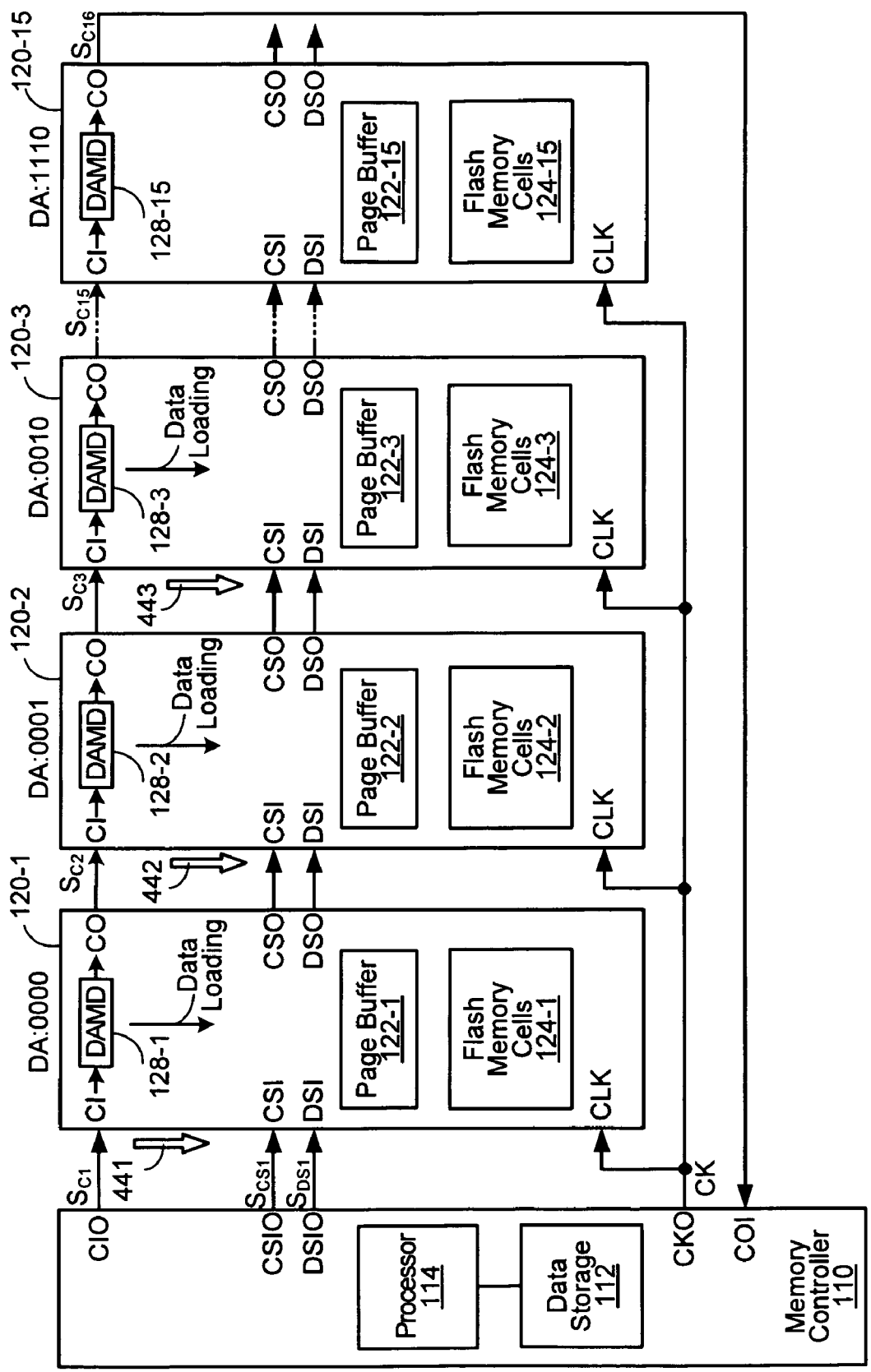
FIG. 12A is a block diagram of the system of FIG. 3A wherein three data transfers are performed for a temporary cache.

FIG. 12A shows the system of FIG. 3A wherein three data transfers are performed for a temporary cache. FIG. 12B shows the data transfers shown in FIG. 12A. FIG. 12C shows timing for the data transfers in the system shown in FIG. 12A.

Referring to FIGS. 11, 12A, 12B and 12C, the data storage 112 of the memory controller 110 store data (of, e.g., 10K bytes) comprised of Data 1 (4K bytes), Data 2 (4K bytes) and Data 3 (2K bytes). The capacity of each page buffer is smaller than the data to be temporarily cached (i.e., 10K bytes). Therefore, one page buffer is not enough for temporary cache for the data.

Data 1, 2 and 3 are sequentially stored in three temporary caches. The memory controller 110 issues a command containing a device address DA (0000), a 'Burst Data Load' OP code and Data 1 (step-19-1). The first device 120-1 is designated and selected in accordance with the device address DA. Data 1 is stored in the page buffer 122-1 of the selected memory device 120-1 (step 19-2). Then, the memory controller 110 determines whether more cache needs (step 19-3). In this case, another cache is necessary (YES at step 19-3), the memory controller 110 issues a command containing a device address DA (0001), a 'Burst Data Load' OP code and Data 2 (step 19-1). The second device 120-2 is designated and selected in accordance with the device address DA. Data 2 is stored in the page buffer 122-2 of the selected memory device 120-2 (step 19-2). Again, the memory controller 110 issues a command containing a device address DA (0010), a 'Burst Data Load' OP code and Data 3 (step 19-1). No more cache is necessary (NO at step 19-3) and temporary stores are completed.

In the data recovery operation, Data 1, 2 and 3 temporarily stored in the page buffers 122-1, 122-2 and 122-3 are sequentially read and back to the data storage 112 of the memory controller 110.

The memory controller 110 sends a command containing a device address DA (0000) and OP code for 'Burst Data Read'. Upon device address match determination, the first memory device 120-1 processes the command and Data 1 temporarily stored in the page buffer 122-1 of the first memory device 120-1 is read and the read data is sent back to the memory controller 110 through the remaining memory devices (step 19-4). More reading back is required (YES at step 19-5), step 19-4 is repeated. Thus, the memory controller 110 sends a command containing a device address DA (0001) and OP code for 'Burst Data Read'. Upon device address match determination, the second memory device 120-1 processes the command and Data 2 temporarily stored in the page buffer 122-2 of the second memory device 120-2 is read and the read data is sent back to the memory controller 110 through the remaining memory devices (step 19-4). Similarly, the memory controller 110 sends a command containing a device address DA (0010) and OP code for 'Burst Data Read'. Upon device address match determination, the third memory device 120-3 processes the command and Data 3 temporarily stored in the page buffer 122-3 of the second memory device 120-3 is read and the read data is sent back to the memory controller 110 through the remaining memory devices (step 19-4). No more reading is necessary (NO at step 19-5) and reading back operation is completed.

Another scenario is that while the capacity of the data storage 112 is smaller than that of each page buffer, the character of Data 1, 2 and 3 are different (e.g., instruction command, data value to be stored in the flash memory) and Data 1, 2 and 3 are separately cached. In such a scenario, process is the same as described above.

In some embodiments of the present invention, the systems described herein are implemented using a flexible modular command structure, example details of which have already been provided. Further example details are provided in this section with reference to FIGS. 13 through 21. It is to be understood that the details provided in this section are very specific for exemplary purposes only.

FIG. 13 is a table of an example command set for flash memory with modular command in byte mode. The table includes 14 operations: Page Read, Page Read for Copy, Burst Data Read, Burst Data Load Start, Burst Data Load, Page Program, Block Erase Address Input, Page-pair Erase Address Input, Erase, Operation Abort, Read Device Status, Read Device Information Register, Read Link Configuration Register, and Write Link Configuration Register. Each operation has a command including a Device Address (DA) (1 Byte) and an Operation (OP) Code (1 Byte). Some commands include a Row Address (3 Bytes), a Column Address (2 Bytes), and some commands include Input Data (1 to 2112 Bytes). 'X' is '0h' for "Bank 0". 'X' is '1h' for "Bank 1" where it is assumed for this specific example that each device has two memory banks. More generally each device has at least one memory bank. For the last command in the table, namely the write link configuration (broadcast), the device address is set to "FFh" to indicate a "broadcasting" command.

FIG. 14 is an example operation table. The table includes modes for each of a plurality of combinations of /RST (complement of a reset signal), /CE (complement of a chip enable signal), CSI (command strobe input), and DSI (data strobe input). The modes include Command Data Packet, Read Data Packet, NOP (NO Operation), Standby, and Reset.

All commands, addresses, and data are shifted in and out of the memory device, starting with the most significant bit (MSB). Command input (CI) is sampled at the positive or negative clock edge (i.e., at the crossing point of clocks—CK and /CK) while the command strobe input (CSI) is "high". Each command includes a 1-byte device address (DA) and 1-byte OP code and/or column-address/row-address/data-input bytes if necessary. Once the CSI transits logic "high", the 1-byte DA (Device Address) is shifted into a DA register, and then the 1-byte OP code is shifted into an OP code register. In so doing, the most significant bit (MSB) starts first on CI and each bit is latched at the crossing of CK and /CK while CSI is logic-HIGH state. However every input sequence in byte mode starts at a rising edge of CK (=falling edge of /CK). Depending on the command, the OP Code are followed by address bytes, data bytes, both or none as shown in FIG. 13. For this example, the address cycle has a 2-byte column address and 3-byte row address. FIG. 15 shows a definition of an example command and address format including the position of each bit.

For the memory devices connected in-series, a special device address (=FFh) is assigned for "Broadcast" operation. More generally, the address that is defined for broadcast mode operation can be defined on an implementation specific basis. This "Broadcast Device Address" may be used with any command. However, using the broadcast device address (FFh) along with the "read-type" commands is not recommended because the read data from the last device is the only valid output data.

In some implementations, the signal bus on a modular command Flash device is fully multiplexed as command, address and data all share the same pin(s). The CSI signal's logic-high state validates the Command Input (CI) which can be an n-bit wide signal containing multiplexed command/address/data information for the memory device. If the CSI signal stays in logic-low state, device ignores signal inputs from CI pins. The command input sequence normally consists of one-byte DA (Device Address) latch cycles, one-byte command latch cycles, address latch cycles (=3-bytes for row address or 2-bytes for column addresses) and/or data-input latch cycles up to 2,112 bytes. In 1-bit link mode, four clock-cycles at DDR (double data rate) make one byte of a serial packet. In 2-bit link mode, two clock-cycles at DDR (double data rate) make one byte of a serial packet. In 4-bit link mode, one clock-cycle at DDR (double data rate) makes one byte of a serial packet. Every set of command instructions may be followed by two extra CK and /CK transitions after CSI makes a HIGH to LOW transition. In some embodiments, an extra number of CK and CK transitions after $S_{CSi}$ transitions to low are used that are equal in number to 2+ the number of devices in the architecture with devices connected together in-series. Every input sequence defined in FIG. 13 is "byte-based", which means that $S_{CSi}$ and $S_{Ci}$ should be valid for the unit of 8-latch cycles (=4 clock cycles at double data rate). If $S_{CSi}$ makes a HIGH to LOW transition before the completion of byte, corresponding command and/or address sequences will be ignored by device. For the case of data input sequence, the last incomplete byte of input data will be ignored, but prior complete byte(s) of input data will be valid.

Figure 16:
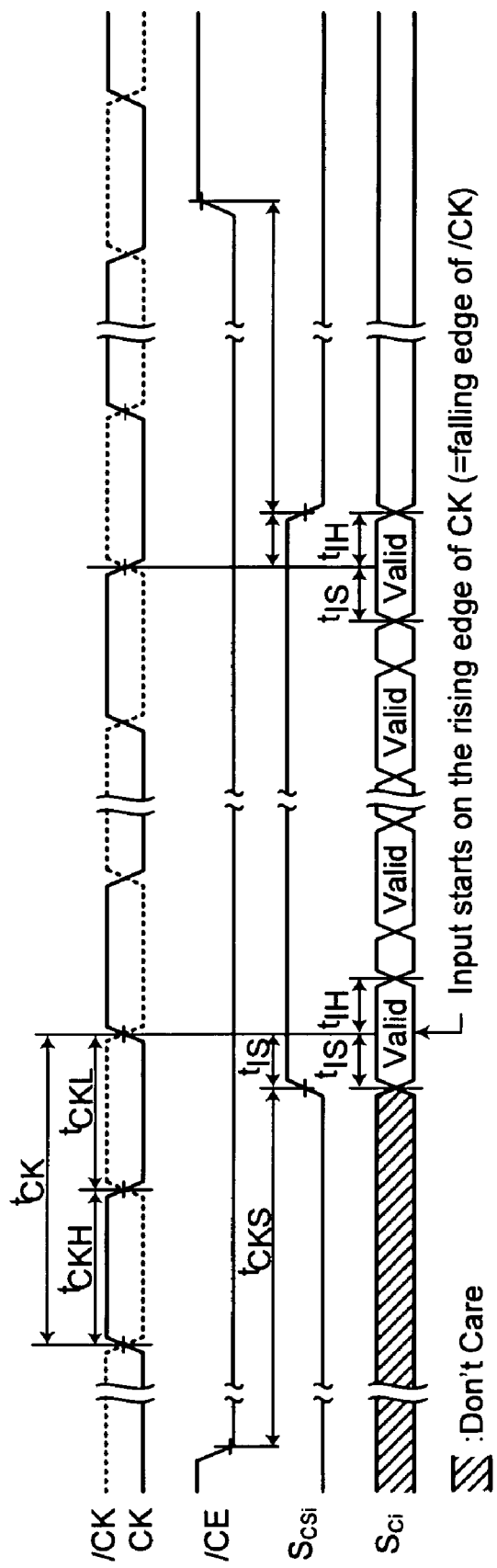
FIG. 16 is an example timing diagram showing basic input timing of a system.
Figure 17:
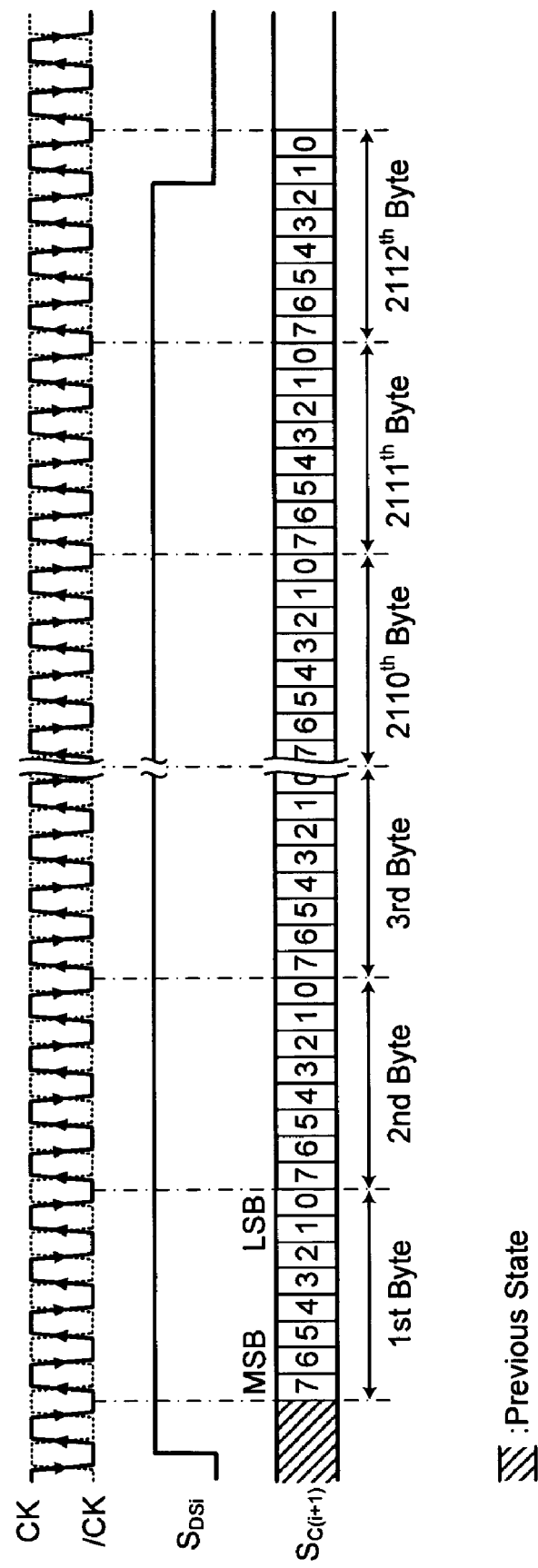
FIG. 17 is an example timing diagram showing an input sequence of bit streams in a modular command NAND flash memory system.

FIG. 16 is an example timing diagram showing basic input timing. All DA/Command/Address/Data-Inputs are asserted continuously through CI port(s) and captured on the crossing of CK and /CK when /CE is "low" and $S_{CSi}$ is "high". The input data is shifted into the memory device, most significant bit (MSB) first on $S_{Ci}$, each bit being latched at the crossing of CK and /CK. An input sequence of bit streams is shown in FIG. 17. Every input sequence in byte mode starts at rising edge of CK as shown. Any input with incomplete byte will be ignored.

Figure 18:
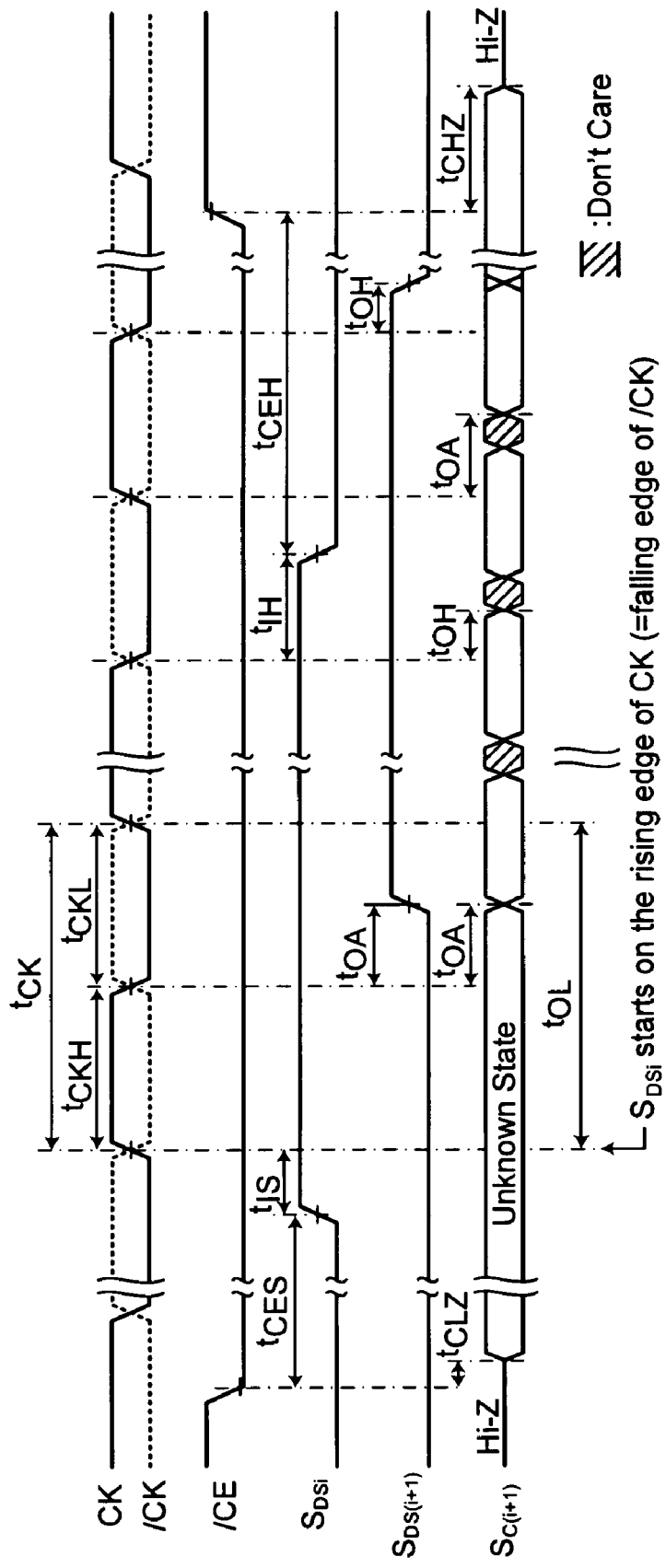
FIG. 18 is an example timing diagram showing basic output timing in a memory system.
Figure 19:
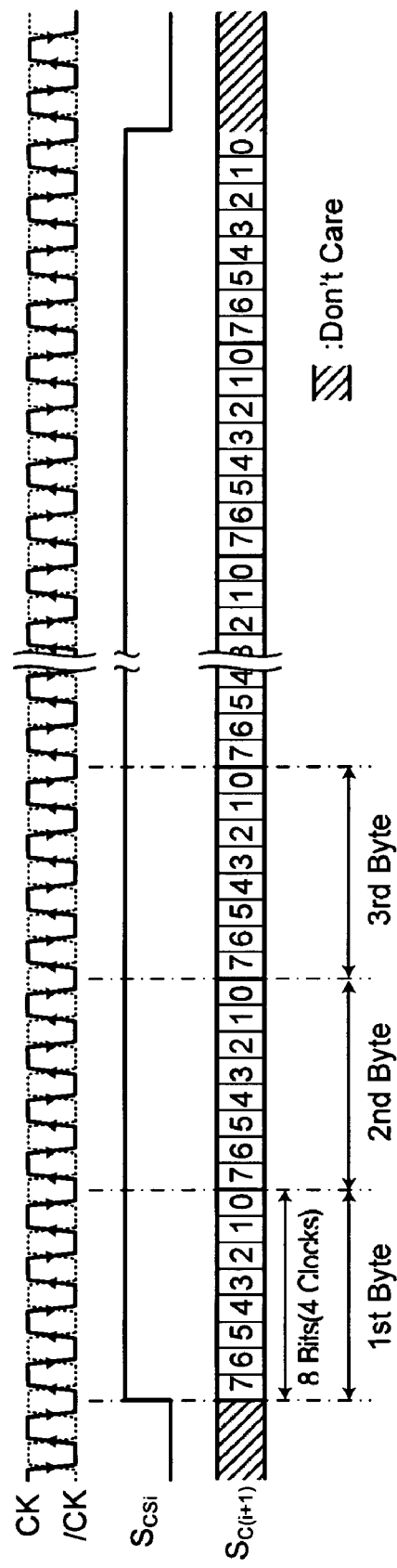
FIG. 19 is an example timing diagram showing an output sequence of bit streams in a memory system.

FIG. 18 is an example timing diagram showing basic output timing. The output on $S_{C(i+1)}$ is synchronously shifted out at the crossing of CK and /CK when /CE is "low", and $S_{DSi}$ is "high". FIG. 19 shows an example output sequence in byte mode. The output data is shifted from the memory device, most significant bit (MSB) first on $S_{C(i+1)}$, each bit being synchronized at the crossing of CK and /CK. The $S_{DSi}$ signal is activated referenced to the rising edge of CK so that every output sequence in byte mode starts at rising edge of CK with 1 clock read latency ($=t_{OL}$) as shown in FIG. 18.

Figure 20:
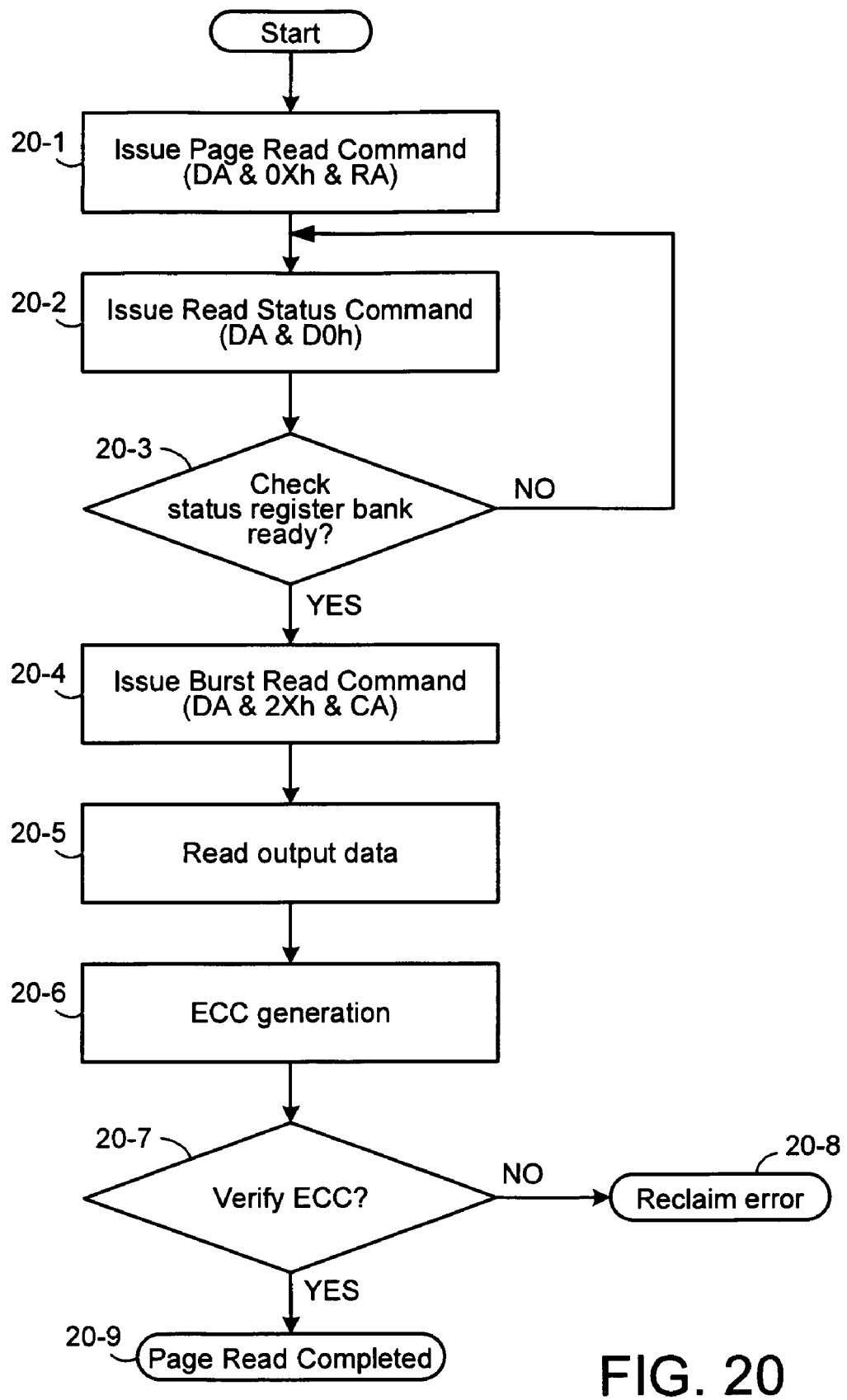
FIG. 20 is a flowchart of a method of page read operation.

Two representative commands to show the feature of modular commands are described below, namely a Page Read (DA and 0Xh) and a Burst Data Read (DA and 2Xh) command. FIG. 20 shows a flowchart involving the use of these commands, and FIG. 21 shows an example command sequence.

Figure 21:
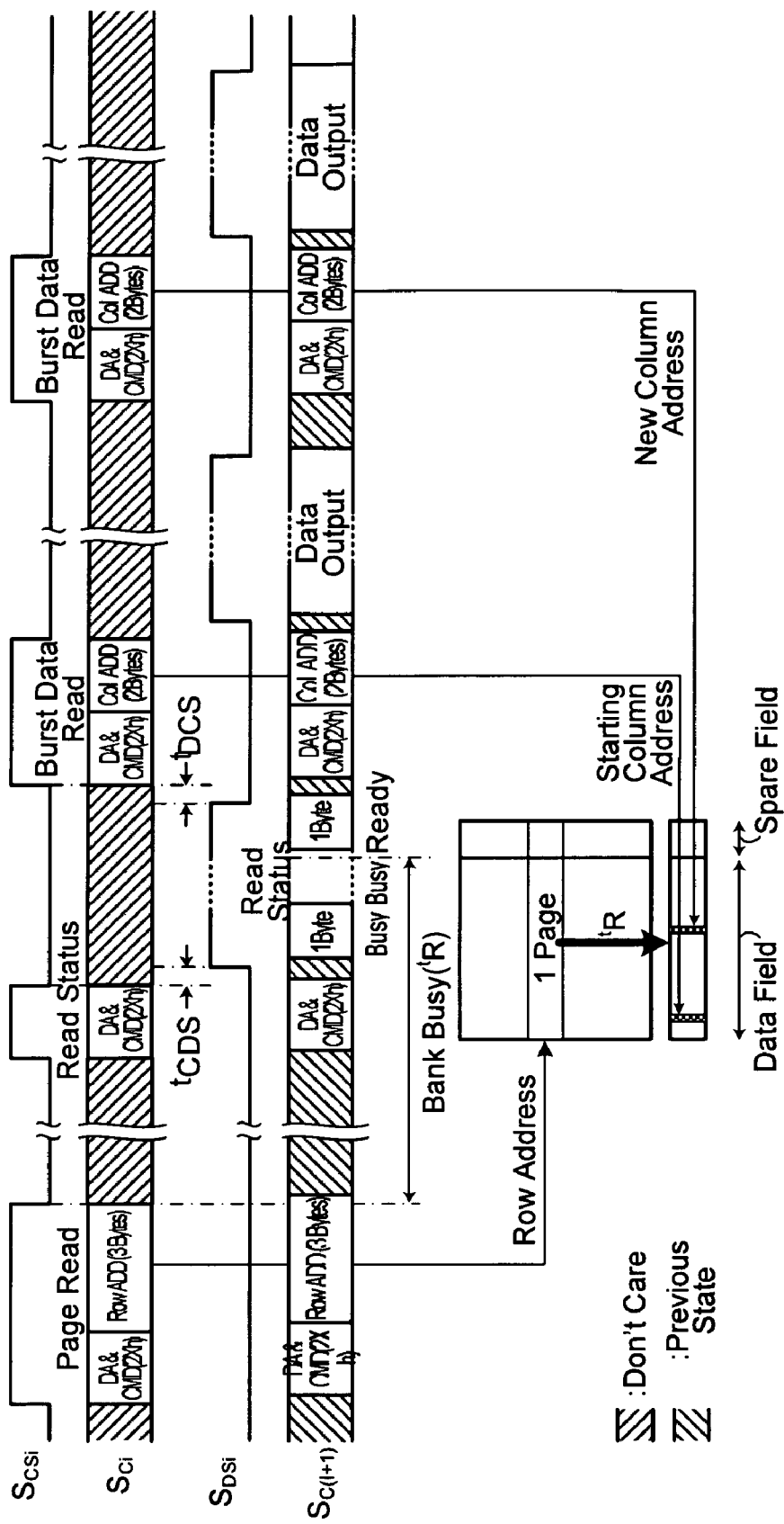
FIG. 21 is an example timing diagram showing page read and burst data read operations.

Referring to FIGS. 20 and 21, to enter the Page Read mode, at step 20-1 the memory controller issues the PAGE READ (DA and 0Xh) command to the command register via $S_{Ci}$ along with three row address bytes. Issuing DA and 0Xh to the command register starts the address latch cycles at step 20-2. Three bytes of row address are input next. The internal page read operation starts once the address latch cycles are finished. The 2,112 bytes of data within the selected page are sensed and transferred to the page buffers in less than $t_R$ (transfer time from cell array to page buffers). The status register can be checked at step 20-3. After $t_R$, a BURST DATA READ (DA and 2Xh) command (described in further detail below) along with two bytes of column address can be issued at step 20-4 and then the $S_{DSi}$ signal can be enabled in order to read out page buffers' data, starting from the given column address, via $S_{C(i+1)}$ until $S_{DSi}$ goes low. If a user wants to monitor the internal page read status to determine whether the transfer from the cell array to page buffers is complete or not, the READ DEVICE STATUS (DA and D0h) command can be issued. Modular command flash has an 8-bit status register that the software can read during device operation.

The core access operations such as page read, page program and block erase take long time and their processing times are varied according to PVT (Process/Voltage/Temperature) change. So, whenever issuing core access commands, a user can monitor the status of each operation after asserting command without interrupting internal operations. The other purpose of the status register is to check whether or not the page program and block erase are performed without fail. In case of fail, a new row position is determined by the memory controller and it issues a new command containing new row address to write the same data that was written to the old row location that failed to be written. Without monitoring the status register, the memory controller does not know that the program and erase operations are done without fail.

After READ DEVICE STATUS (DA and D0h) command, using DSI, all 8-bit status is read from the status register until DSI goes to low. After the BURST DATA READ (DA and 2Xh) command has been issued and then DSI goes to high, the serial output timing as shown in FIG. 21 will result in outputting data at step 20-5, starting from the initial column address. The column address will be automatically increased during outputting data. At step 20-6, there is ECC generation. If the ECC is verified at step 20-7, then the page read is completed. Otherwise, at step 20-8 there is an error.

The BURST DATA READ (DA and 2Xh) command referred to above enables the user to specify a column address so the data at the page buffers can be read starting from the given column address within the selected page size while $S_{DSi}$ is high. The burst data read mode is enabled after a normal PAGE READ (DA and 0Xh) command and page loading time ($=t_R$). The BURST DATA READ (DA and 2Xh) command can be issued without limit within the page. Every BURST DATA READ command can have same or different column address from the previous BURST DATA READ command. Only data on the current page buffers can be read. If a different page is to be read, a new PAGE READ (DA and 0Xh) command should be issued. And after $t_R$, a new BURST DATA READ (DA and 2Xh) command can be issued to access new page data.

In the embodiments described above, the device elements and circuits are connected to each other as shown in the figures, for the sake of simplicity. In practical applications of the present invention, elements, circuits, etc. may be connected directly to each other. As well, elements, circuits etc. may be connected indirectly to each other through other elements, circuits, etc., necessary for operation of the memory devices or apparatus. Thus, in actual configuration of devices and apparatus, the elements and circuits are directly or indirectly coupled with or connected to each other.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for communicating with a serial interconnection of a plurality of memory devices connected in-series, at least one of the memory devices having a temporary store element and a device identification associated with an address in the serial interconnection, the method comprising:

sending a write command including a device identification, a write operation instruction and data stored in a data storage to the serial interconnection, the plurality of memory devices being configured to propagate the write command therethrough in response to a propagation control, at the at least one of the memory devices, determining whether it is selected based on the device identification included in the write command and the associated device identification, in a case of determination where the memory device is selected, a selection determination for writing being provided, writing the data to the temporary store element of the memory device in response to the selection determination for writing and the write operation instruction;

at a later time, sending a read command including a device identification and a read operation instruction to the serial interconnection, the plurality of memory devices being configured to propagate the read command therethrough in response to the propagation control, at the at least one of the memory devices, determining whether it is selected based on the device identification included in the read command and the associated device identification, in a case of determination where the memory device is selected, a selection determination for reading being provided, reading the data written to the temporary store element of the memory device in response to the selection determination for reading and the read instruction, the read data being provided through the serial interconnection to the data storage.

2. The method of claim 1 further comprising
storing the data provided from the memory device responded to the selection determination for reading to the data storage.

3. The method of claim 2 further comprising:
freeing up space storing the data in the data storage after performing the step of sending the write command.

4. The method of claim 1 wherein:
at the at least one of the memory devices
the step of determining comprises determining whether the device identification included in the write command matches the associated device identification, in a case of device identification matching, the selection determination for writing being provided,
the step of determining comprises at the later time comprises determining whether the device identification included in the read command matches the associated device identification, in a case of device identification matching, the selection determination for reading being provided.

5. The method of claim 1 wherein the propagation control comprises first and second enable signals, at each of the memory devices,
the first enable signal enabling the memory device to respond to the received write command or the received read command; and
the second transfer enable signal enabling the memory device to transfer the received write command or the received read command to another memory device of the serial interconnection.

6. The method of claim 1 further comprising:
freeing up space storing the data in the data storage after performing the step of sending the write command; and
after performing the step of freeing, storing the data provided from the memory device responded to the selection determination for reading to the data storage.

7. A system comprising:
a serial interconnection of a plurality of memory devices connected in-series, each of the memory devices having a temporary store element and a device identification associated with an address in the serial interconnection; and
an apparatus for communicating with the plurality of memory devices, the apparatus comprising a data storage and a processor for
sending a write command including a device identification, a write operation instruction and data stored in the data storage to the serial interconnection, the plurality of memory devices being configured to propagate the write command therethrough in response to a propagation control; and
at a later time, sending a read command including a device identification and a read operation instruction to the serial interconnection, the plurality of memory devices being configured to propagate the write command therethrough in response to the propagation control,
each of the plurality of memory devices being configured
to determine whether it is selected based on the device identification included in the write command and the associated device identification, in a case of determination where the memory device is selected, a selection determination for writing being provided,
the data being written to the temporary store element of the memory device in response to the selection determination for writing and the write operation instruction included in the write command,
to determine whether it is selected based on the device identification included in the read command and the associated device identification, in a case of determination where the memory device is selected, a selection determination for reading being provided,
the data written to the temporary store element of the memory device being read in response to the selection determination for reading and the read operation instruction included in the read command, the read data being provided through the serial interconnection to the apparatus.

8. The system of claim 7 wherein the processor is configured to free up space in the data storage of the apparatus upon sending the write command to the serial interconnection.

9. The system of claim 8 wherein:
the processor is further configured to store the read data into the data storage of the apparatus upon receiving the data provided from the memory device that responded to the determination selection for reading.

10. The system of claim 7 wherein each of the plurality of memory devices is a non-volatile memory device.

11. The system of claim 10 wherein the non-volatile memory device comprises a NAND flash device.

12. The system of claim 11 wherein the NAND flash device has a page buffer as the temporary store element for temporary storing information on data.

13. The system of claim 7 wherein each of the memory devices is configured:
to determine whether the device identification included in the write command matches the associated device identification, in a case of device identification matching, the selection determination for writing being provided; and
to determine whether the device identification included in the read command matches the associated device identification, in a case of device identification matching, the selection determination for reading being provided.

14. The system of claim 7 wherein each of the memory devices further has a first input for receiving the write command and receiving the read command at the later time.

15. The system of claim 14 wherein each of the memory devices further has second and third inputs for receiving first and second enable signals, respectively,
the first enable signal enabling the memory device to respond to the received write command or the received read command,
the second enable signal enabling the memory device to transfer the received write command or the received read command to another memory device of the serial interconnection.

* * * * *